(12) United States Patent
Fallin et al.

(10) Patent No.: US 6,474,924 B2
(45) Date of Patent: Nov. 5, 2002

(54) SKID HANDLING SYSTEM FOR FLOW THROUGH STORAGE

(75) Inventors: Larry W. Fallin, Dakota Dunes, SD (US); Barbara J. Scalia, Sioux City, IA (US); Ronald D. Smith, McCook, SD (US); James F. Dill, Foxboro, MA (US); Timothy J. Mason, Uxbridge, MA (US); Edward M. Kolvek, West Newbury, MA (US); Stephen N. Forti, Stoneham, MA (US); Roland H. Estey, III, Concord, MA (US); James R. Downer, Canton, MA (US); Carl Brian Candiloro, Waltham, MA (US); Andrew S. Courier, Mansfield, MA (US)

(73) Assignee: IBP, Inc., Dakota Dunes, SD (US)

( * ) Notice: Subject to any disclaimer, the term of this patent is extended or adjusted under 35 U.S.C. 154(b) by 0 days.

(21) Appl. No.: 09/683,821

(22) Filed: Feb. 20, 2002

(65) Prior Publication Data

US 2002/0071747 A1 Jun. 13, 2002

Related U.S. Application Data

(62) Division of application No. 09/548,974, filed on Apr. 13, 2000, now Pat. No. 6,409,451.

(51) Int. Cl.⁷ .............................. B65G 1/00; B65G 1/04
(52) U.S. Cl. ...................... 414/277; 414/279; 414/280; 414/281; 414/282
(58) Field of Search ................................ 414/277, 279, 414/280, 281, 282

(56) References Cited

U.S. PATENT DOCUMENTS

| | | |
|---|---|---|
| 1,887,211 A | 11/1932 | Mortimer |
| 2,485,040 A | 10/1949 | Cupo |
| 2,769,557 A | 11/1956 | Ohr |
| 3,049,247 A | 8/1962 | Lemelson |
| 3,225,891 A | 12/1965 | Hickin et al. |
| 3,246,733 A | 4/1966 | Torbet et al. |
| 3,302,803 A | 2/1967 | Mooney |
| 3,403,794 A | 10/1968 | Lopez |
| 3,456,773 A | 7/1969 | Titmas, Jr. |
| 3,593,862 A | 7/1971 | Pierson |
| 3,627,106 A | 12/1971 | Winfield |
| 3,820,667 A | 6/1974 | Critchlow et al. |
| 3,970,840 A | 7/1976 | De Bruline |
| 4,101,020 A | 7/1978 | Langen |
| 4,492,504 A | 1/1985 | Hainsworth |
| 4,615,429 A | 10/1986 | Arase |
| 4,756,657 A | 7/1988 | Kinney |
| 4,829,634 A | 5/1989 | Keith et al. |
| 4,878,798 A | 11/1989 | Johansson |
| 5,024,572 A | 6/1991 | Tanaka et al. |
| 5,106,259 A * | 4/1992 | Anderson et al. ........... 414/786 |
| 5,129,777 A | 7/1992 | Pohjonen et al. |
| 5,226,782 A | 7/1993 | Rigling |
| 5,275,272 A | 1/1994 | Ydoate |
| 5,333,983 A * | 8/1994 | Hatouchi et al. ........... 414/331 |
| 5,362,197 A | 11/1994 | Rigling |
| 5,380,139 A | 1/1995 | Rohjonen et al. |
| 5,421,685 A | 6/1995 | Elmer et al. |
| 5,489,016 A | 2/1996 | Welch |
| 5,558,483 A | 9/1996 | Masuda |
| 5,564,879 A | 10/1996 | Noguchi |
| 5,588,282 A * | 12/1996 | Hartness ....................... 53/473 |
| 5,626,453 A | 5/1997 | Bouche |
| 5,725,082 A | 3/1998 | Connell |

* cited by examiner

*Primary Examiner*—Steven A. Bratlie
(74) *Attorney, Agent, or Firm*—Blackwell Sanders Peper Martin LLP; Mark E. Stallion

(57) ABSTRACT

An autonomous remote controlled vehicle for use in the automation of an existing refrigerated flow through storage facility food processing application. The remote vehicle is specifically designed to operate within a network of centrally controlled remote vehicles that are adapted to receive selectable items from production and temporarily store them for later retrieval. The system is adapted to minimize travel time for the remote vehicle and optimize cycle time. The system is specifically adapted to handle cardboard shipping boxes containing meat products.

15 Claims, 16 Drawing Sheets

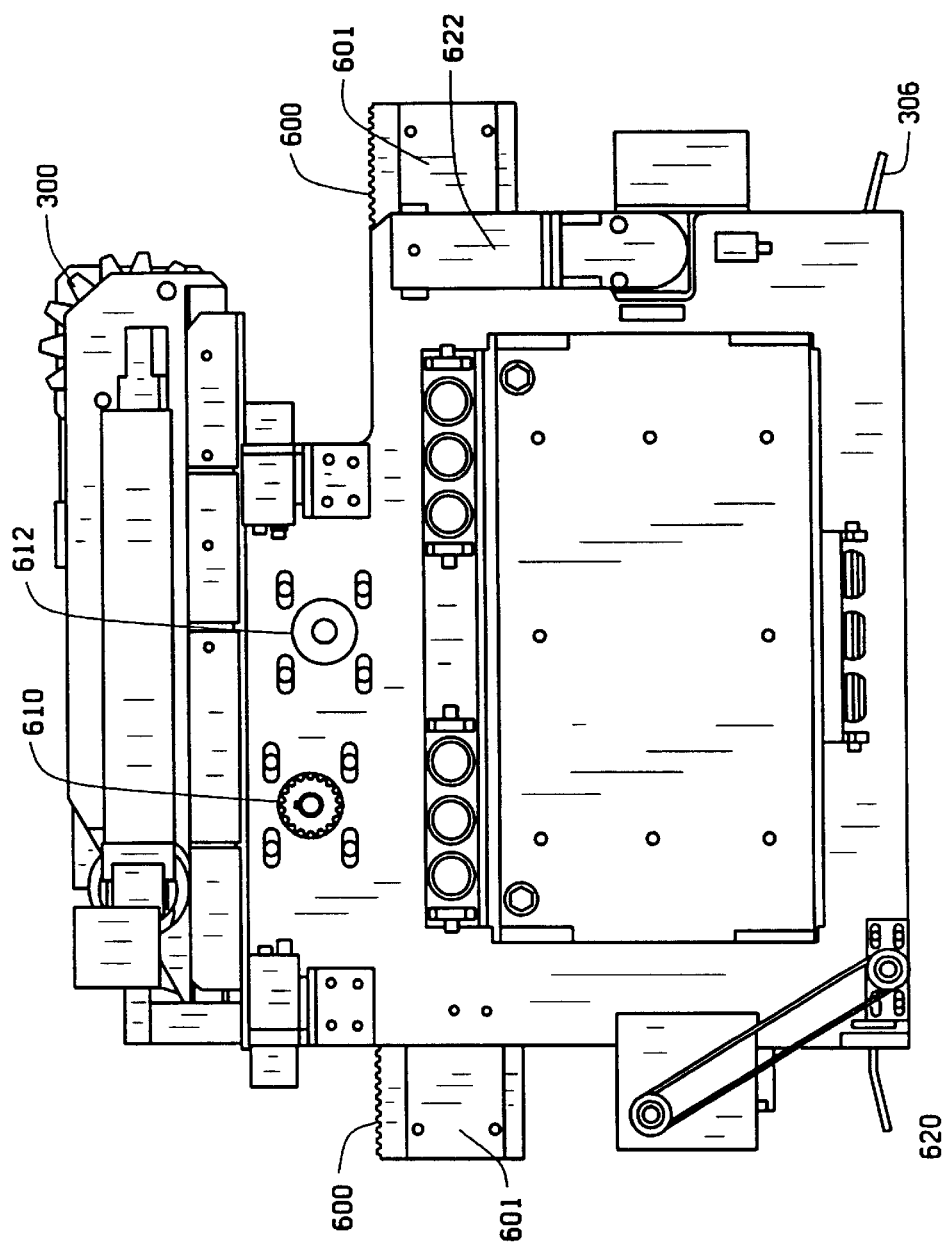

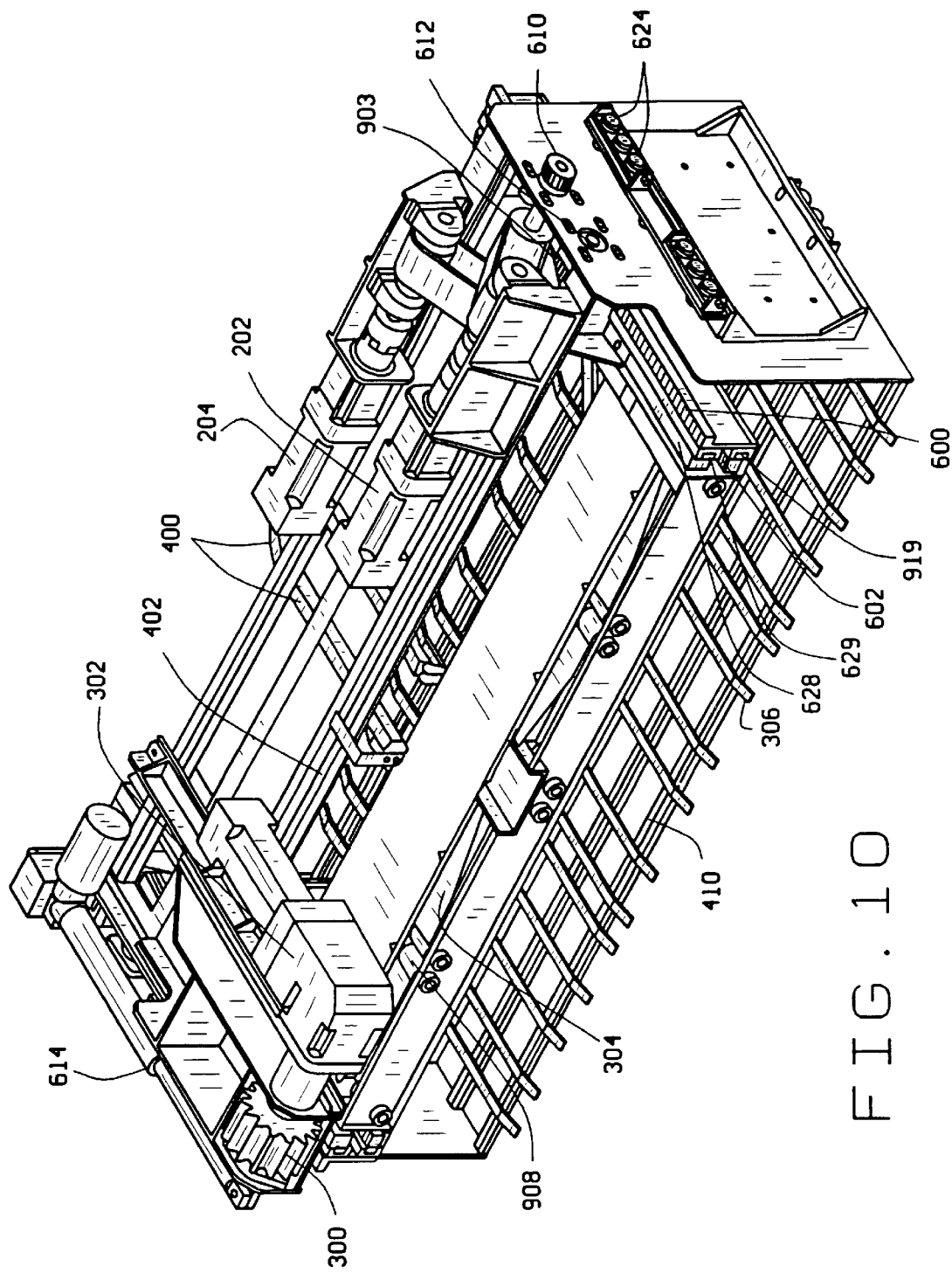

SKID HANDLING SYSTEM FOR FLOW THROUGH STORAGE

Cross Reference TO Related Applications

This application is a divisional application of U.S. application Ser. No. 09/548,974 filed Apr. 13, 2000 entitled Item Handler and Method for Flow Through Storage now U.S. Pat. No. 6,409,451.

BACKGROUND OF INVENTION

This invention relates to an automatic item handling system and methods for handling and transporting items in a facility designed with a flow through storage system. More specifically, the invention relates to automated remote transport and item handling systems that revolve around a network of centrally controlled remote vehicles that handle the storage and retrieval of boxes in a refrigerated flow through storage facility.

RELATED ART

There is a need for an automated item handling system for storing and retrieving items, specifically boxes, that can be implemented in a facility already equipped with a refrigerated flow through storage system and that can be implemented without major modifications to the existing facility. A flow-through storage system is an array of open racks which comprises a plurality of perpendicular crossing beam members that form the rectangular-shaped open storage racks. The term flow-through is used because items are stored through the rear of the storage racks into a bin and the items flow through to the front of the rack where they can be retrieved from the bin. The items are conveyed from the rear of the bin to the front by a conveyance means. A bin is a single open flow through channel or it can be described as a single open shelf in the rack.

Refrigerated meat processing flow through storage facilities are typically maintained at 32° F. or lower, therefore any automated system for storage and retrieval in such a facility must be able to operate under those conditions, which may limit the use of systems requiring hydraulic fluids to function.

A typical storage facility within a typical meat processing facility is centrally located with respect to the production and shipping areas. Also, a typical high volume meat processing flow through storage facility may handle upwards of 60,000 boxes on both the input storage and output retrieval shipment sides on a given day. Therefore, up to 60,000 boxes per day are transported from the meat processing production area and stored in flow through storage bins (lumping) where they remain until they are retrieved (picking) and delivered to a shipping area to fill orders. There is a need to automate the handling of the storage and the retrieval of boxes in a flow through storage facility having a high throughput in order to handle such large quantities efficiently.

Other more modern types of storage facilities include individual bin storage and conveyorized box storage facilities with automated box handling systems. However, some less modern existing storage facilities are designed with flow through storage racking. There are at least two major economic reasons why the existing storage facilities with flow through systems should be maintained with minimum modification rather than converted to accommodate a more modern and different type of storage system.

One economic reason is that flow through facilities typically have a greater storage efficiency in terms of boxes stored per cubic feet of storage volume as compared to modernized individual bin and conveyorized storage facilities with automated box handling.

A second economic reason is that typical automated item handling systems are not designed to meet the unique requirements of a facility that was previously designed to accommodate a flow through storage system, therefore the facility would have to be significantly modified to accommodate a more modern item handling system.

Modification of an existing storage facility, with an existing flow through storage racking system, to accommodate a more modern and different type storage system would be very costly. Therefore, an automated item handling system that can be integrated into an existing flow through storage facility without having to implement major modifications to the facility is needed.

In addition to needing a system that can be integrated without major modifications, there is a need to maintain a safe working environment for the people working in the facility, both when the automated system is operating and when it is not operating. The aisles between flow through storage bins in some existing flow through storage facilities are very narrow (approximately 35 in wide) as they were not designed to allot dedicated space for an automated item handling storage system. Therefore any automated system that requires dedicated floor space for a transport and handling means would further limit the usable floor space between aisles. Limited floor space on which workers can maneuver inherently makes for hazardous work conditions, causing tripping accidents and accidental collisions that may result in injury.

An automated system that inputs or stores boxes into storage bins (lumping) is needed and the same is true for a system that retrieves the boxes for removal from storage for shipping (picking). In addition, however, a typical flow through facility, boxes are stored in flow through bins on skids which are carried on skate conveyors from the input storage (lumping) end of the bin to the output retrieval (picking) end. Therefore, integrated into a flow through storage facility, there is a need for a method and system to remove empty skids from the output end (picking end) and stow them for future use and there is a need for a method and system to insert additional empty skids into the input end (lumping end) when all the skids in the flow through bin are filled to their maximum capacity. Skid handling is an important aspect of any flow through storage item handling system because the picking and lumping will come to a halt until an empty skid is removed when needed or inserted when needed. This function is currently manual and reduces the efficiency of the operation.

A typical automated item handler system that is utilized in a storage facility is designed for a modernized storage facility having individual bin storage or a facility having conveyorized box storage integral with a network of conveyors that transport items to and from storage locations. A design of this type does not meet the requirements outlined above for the automation of an existing flow through storage facility. For example a typical flow through facility may have ceilings no higher than 7 ft.; the lowest level bin is just above floor level; and the aisles are typically no wider than 35 in. Typical automated storage handling systems are not easily integrated into such facilities because they either entail large conveyor systems requiring a lot of space or they are remote vehicles that require large aisles and dedicated floor space for a guidance means.

A review of prior art patents did not reveal any patents that specifically address the needs of a flow through storage facility. However, there are some prior art patents that address box handling functions for a storage facility that are typical of those used in individual bin or conveyorized storage facilities. In addition, some patents address the problem by the use of a centralized network of Box Handling Robots.

For example, U.S. Pat. 4,492,504 issued Jun. 08, 1985 to Hainsworth addresses an unmanned guided vehicle that is propelled along a path by a traction mechanism. It is clear that the apparatus of this patent is designed to accommodate an individual open bin storage system. However this patent is worthy of noting because it shows an apparatus that performs the general tasks of lumping and picking in a storage facility and is representative of how a facility with an individual bin storage system is automated. However the apparatus shown in Hainsworth '504 does not have the elements or the functionality to meet the particular requirements, as outlined above, for automating an existing flow through storage facility.

The actuator arm of Hainsworth is designed to retrieve one box at a time and there is only one arm per robot, thus multiple items from a skid could not be retrieved simultaneously. It will be difficult to maintain a desired flow of handling 60,000 items per day on both the input (lumping) end and the output (picking) end with the Hainsworth design. Also, in a typical flow through system, boxes are stored on skids that rest on skate conveyors. Also, boxes are stacked in multiple rows usually two rows high. Therefore, if the one arm system shown in Hainsworth is used and the arm attempts to remove a box on the top row, it is likely that the box underneath will move due to friction, or possibly the entire skid will move. There is no means to prevent the lower tier box or the skid from moving.

Also, the guidance system of Hainsworth comprises a radiation source that causes a guide line to reflect or emit a guidance signal. Hainsworth also discloses alternative guidance methods such as a fixed rail system or a buried wire guidance system. Either of the disclosed guidance methods will require dedicated space for the tracking means. This would further narrow the useable floor space between flow through bins even when the remote vehicle is not passing through. Also, either guidance method will require modification to the floor of an existing facility, or as a minimum the floor would have to be leveled and repaired to eliminate dips or cracks in the floor prior to installing the radiating strip. However, in the case of a buried wire guidance method, a portion of the floor would have to be torn up in order to install the wire. Either method is contrary to the requirements outlined above for automating an existing flow through facility because of the extensive modifications and safety impacts.

A way is needed to reliably lump and pick items in an existing flow through storage facility and to make a seamless transport of boxes from production to storage and onto shipping. There is also a need for the item handler to automatically identify the item to be lumped or picked so that travel time and cycle time is minimized for a more efficient operation.

SUMMARY OF INVENTION

It is in view of the above problems that the present invention was developed. It is an object of this invention to automate the lumping and picking of items in an existing flow through storage facility efficiently and with minimal impact to the existing facility.

It is also an object of this invention to maintain the current available floor space between the flow through storage bins in order to assure easy and safe access.

It is also an object of this invention to remove empty skids from the flow through bin, stow them as needed and then retrieve and reinsert empty skids into the flow through bins as needed.

It is also an object of this invention to more reliably automate an existing storage facility with a centrally controlled network of semi autonomous lumping and picking means that make a seamless transport of boxes from production to storage and onto shipping.

The invention satisfies the above objects by providing a method and apparatus for the automation of an existing flow through facility—that is providing a centrally controlled network of semi-autonomous mobile robotic vehicles having on-board embedded controls. The robotic vehicle is adapted with a means for storing boxes in (lumping) and retrieving boxes from (picking) flow through storage bins and is adapted with a means for stowing empty skids and re-inserting empty skids into flow through storage bins. The robotic vehicle has an on-board communication means that is adapted to transmit to and receive signal messages from a centrally controlled network that coordinates the transport of boxes by the remote vehicle from production, to temporary flow through storage and onto shipping. A central data parser is the central point where all information external to the network is received. The data is processed and top level tasks are assigned to central process controllers located on every floor having flow through storage bins. The central process controllers then assign specific tasks to the remote vehicles whereby the on-board controller executes specific picking and lumping operations. The preferred embodiment of the robotic vehicle can be powered by an electric motor and has four wheels that ride on a pair of over-head track rails wherein one of the track rails can be adapted to provide an electrical power connection to the vehicle. The vehicle can be adapted with a trolley type connection frame that can serve both as a connection to the main electrical power and provides moment stability to the vehicle to prevent tipping. In this preferred embodiment, the vehicle is freely suspended hanging from the rails and never touching the floor. The vehicle can also be adapted with collision avoidance sensors for determining vehicle position with respect to other objects and with a means to read a code placed on the exterior of the box for product verification. The vehicle also incorporates absolute encoders to monitor actual distance traveled by the vehicle in order to positively locate the vehicle in the network of storage bins at all times.

The inventor has determined that a centrally controlled network of remote robotic vehicles is effective in automating an existing refrigerated flow through storage facility for the meat processing industry. The remote vehicle is integrated with the flow through storage bins and a conveyor system for transporting boxes to shipping and from production.

BRIEF DESCRIPTION OF DRAWINGS

The advantages of this invention will be better understood by referring to the accompanying drawing.

FIG. 7 shows a left side view of the carriage with arm in a center stowed position.

FIG. 10 shows a top right side rear perspective view.

DETAILED DESCRIPTION

Figure 1:
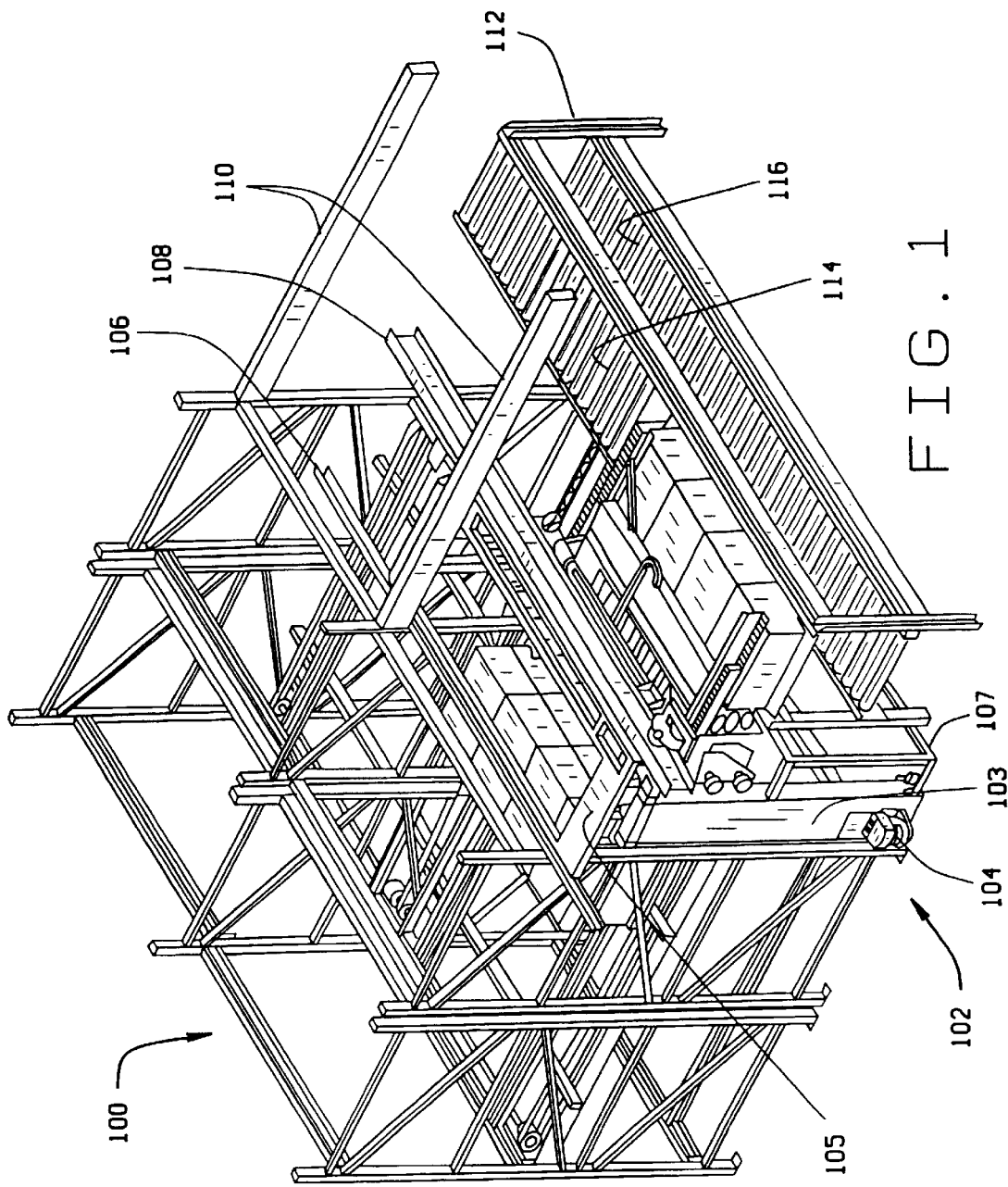
FIG. 1 shows a top—right front perspective view of the remote vehicle, a portion of the flow through bins, and a portion of the conveyor system on the picking side.

Referring to FIG. 1, a top right front perspective view of a portion of the flow through storage bins 100, the remote vehicle 102, and a portion of the conveyor system 112 is shown on the picking side of the flow through bin. Also shown in this view, is a collision avoidance sensor 104 operatively attached to the remote vehicle 102. The remote vehicle 102 is suspended from the overhead track rails 106 and 108. The remote vehicle is freely suspended having no support underneath. The remote vehicle 102 travels on the track rails 106 and 108 by wheels that are fitted in the track rail slots thereby providing an overhead traction mechanism. Track rail 108 provides power to the remote vehicle. The parallel track rails 106 and 108 are supported by a plurality support members 110. The basic construction of the remote vehicle frame comprises a pair of upright side frame members 103 having a hollow interior volume to house an elevation mechanism. Only the right side frame member of the pair is clearly seen from this view. The pair of upright side frame members 103 are spaced apart and bridged together at their upper portions by a horizontally oriented rectangular, elongated frame member 105 which is elongated in the direction of travel, thereby forming an upright chassis. Wheels by which the vehicle travels are attached onto the elongate frame member 105. The carriage of the remote vehicle that is used as a temporary platform to carry boxes is guided by the upright frame members 103. The carriage is more clearly depicted in FIGS. 3 and 9. Support frame 107 provides additional structural integrity and rigidity to the overall vehicle frame and specifically to the upright frame members. The conveyor system 112 that is shown on the picking side is a two-tier system having a top tier picking side conveyor 114 and a bottom tier 116. Conveyor tiers 114 and 116 are conventional cylindrical roller type conveyors. In this view the remote vehicle is shown placing a row of boxes onto the conveyor system 112 after picking the boxes from the appropriate skid. It can be seen in this view that the pinion driven telescoped rail arms are fully extended in the direction of the conveyor in order to translate the row of boxes onto said conveyor. The pinion arms are more clearly shown in FIGS. 6–10. The remote vehicle receives its task instructions from a remote process controller located on every floor having flow through bins. The remote vehicle is instructed what bin to go to and the box type and quantity of boxes to retrieve.

Figure 2:
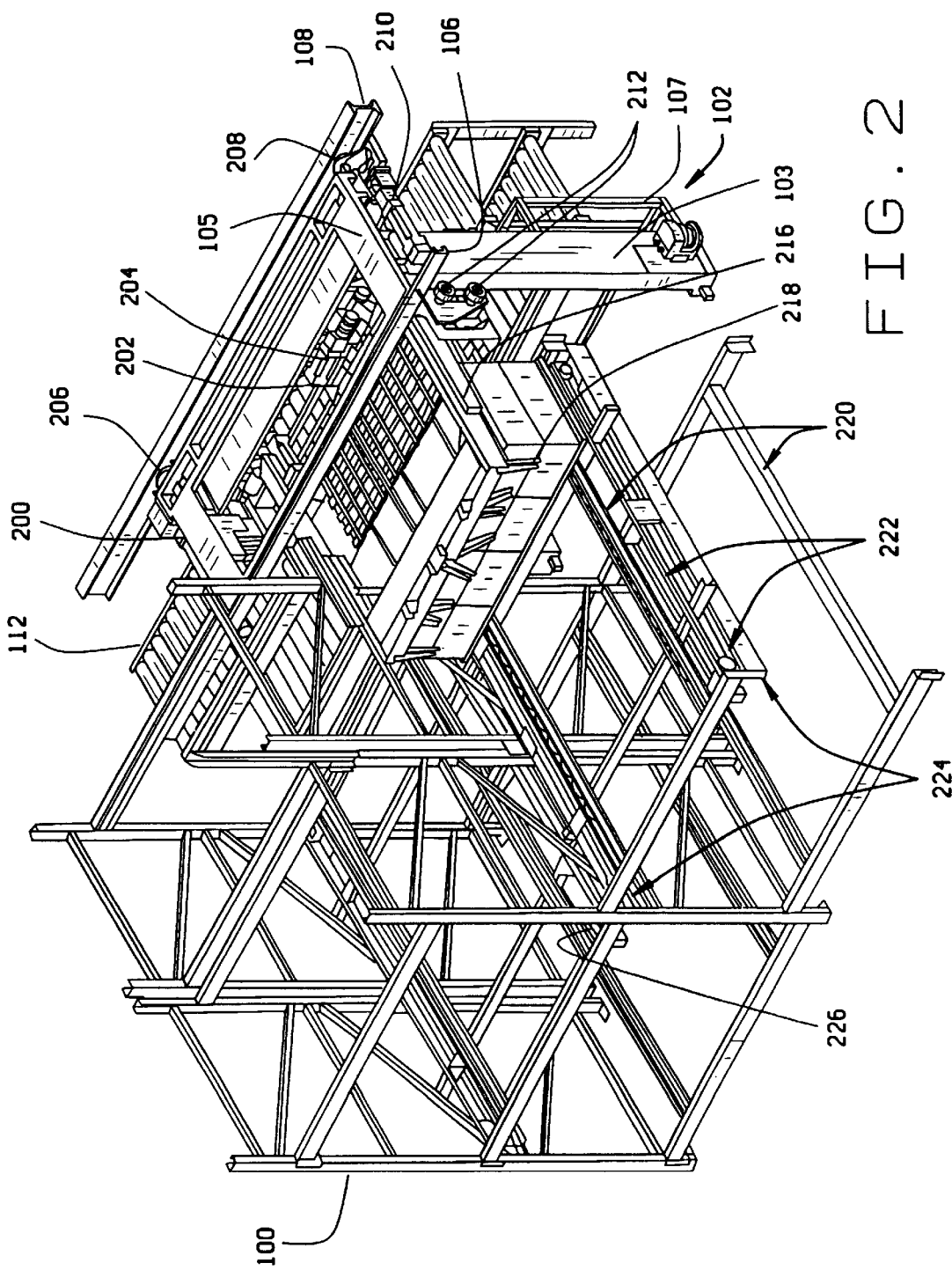
FIG. 2 shows a top—right rear perspective view of a portion of the flow through storage bins (with some members cutaway for clarity), the remote vehicle, and a portion of the conveyor system.

Referring to FIG. 2, a top right rear perspective view of a portion of the flow through storage bins 100 (with some frame members of the flow through bin cut away for clarity), the remote vehicle 102, and a portion of the conveyor system 112 is shown. A perspective of the track rails 106 and 108 are shown in this view as well. Also shown in the view is a first electrical motor 200 (elevator motor) which provides the elevation drive for lifting and lowering the carriage. A second electrical motor 204 (arm motor) is shown and provides the drive for the telescoped rail arms 216. A third electrical motor 202 (carriage motor) is shown which provides the drive for moving the carriage toward and away from storage bins. A fourth electrical motor 210 (transport motor) is shown which is the drive for translating on the track rails. Shown in this view are wheels 206 and 208 operatively connected to the remote vehicle via an axial member attached to elongated rectangular frame member 105 and these wheels are disposed on opposite ends of the remote vehicle 102. Track wheels 208 and 206 are engaging the track rail 108 in order that the remote vehicle 102 can travel along said rail 108. Wheels 206 and 208 are powered by motor 210. Motor 210 is the sole power for vehicle traction.

A first pair of stabilizing wheels 212 are shown attached to the carriage portion of the remote vehicle 102 in order to stabilize the carriage during elevation of the carriage and onloading and offloading boxes onto said carriage. There is a second pair of identical wheels on the opposing exterior side (the front or picking side) of frame member 103. Frame member 103 provides support to these wheels and the carriage acting as a guide member on which the wheels 212 travel.

Also shown in this view are the pinion driven telescoped rail arms 216 fully extended such that the plurality of finger members 218 can be positioned behind the boxes to be removed. The fingers are rotated down behind the boxes such that when the arm is retracted the boxes will be drawn onto the platform by the plurality of fingers. The fingers are independently powered and can be independently actuated. The boxes in this view are shown stacked two rows high on top of a skid that rests on a pair of skate roller conveyor rails.

Figure 11:
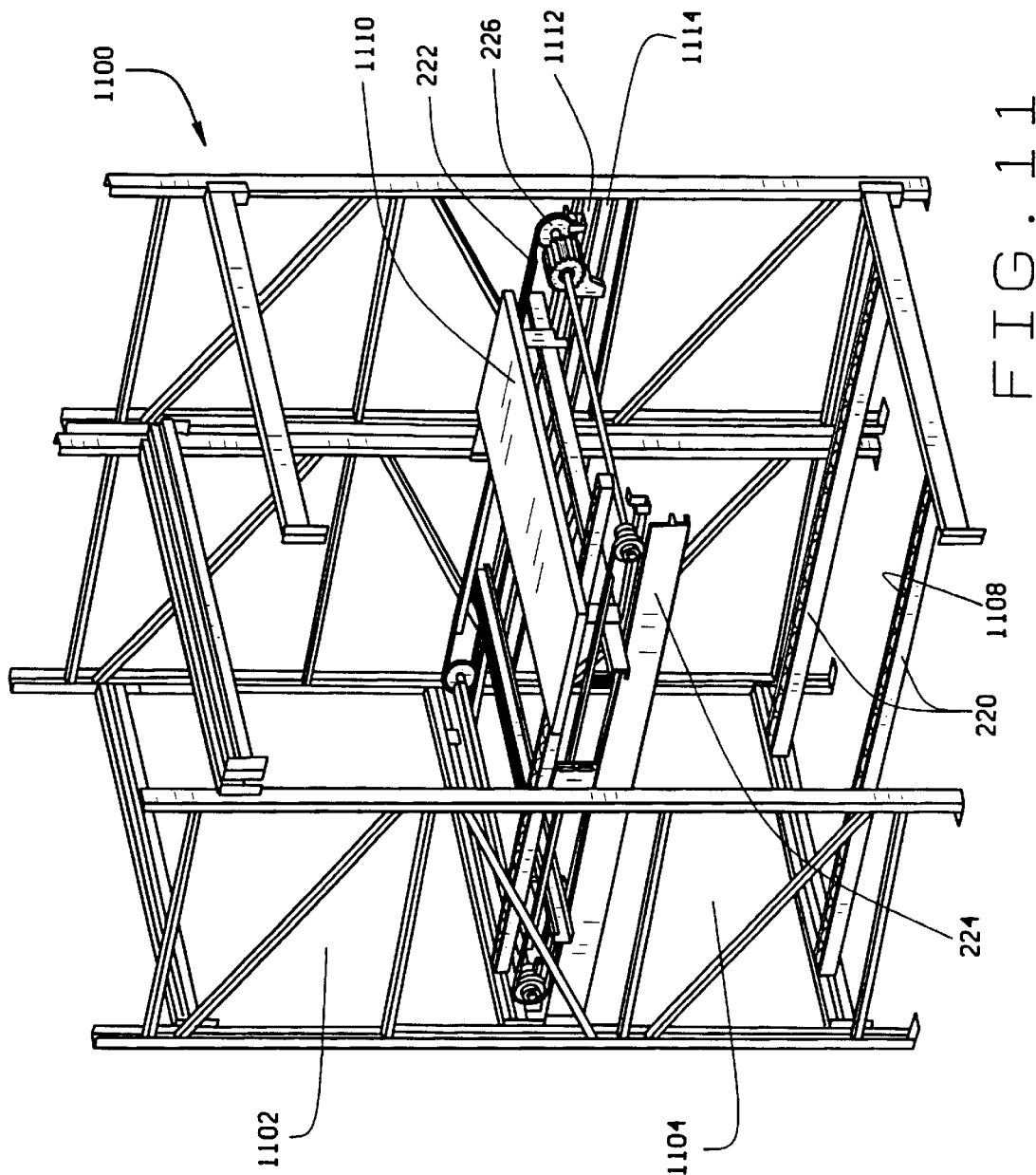
FIG. 11 shows a right front perspective view of the flow through bin (with a portion cut away for clarity).

Also shown in this view is a skid drive belt 222 which is utilized to stow empty skids to be discussed in detail when describing FIG. 11. The skid drive belt has dogs which drive the skid to the desired location.

Also shown in this view is an empty skid storage rack 224 for stowing empty skids. Also shown in this view is skid conveyor gear 226 which is operatively connected to the skid drive conveyor belt 222 by an axial member. Skid conveyor gear 226 is engaged by a mating drive gear 300 on the remote vehicle whereby the remote vehicle powers the gear interface in order to convey empty skids in stow to the rear of a storage bin to enable an empty skid to be retrieved for insertion of empty skids into the flow through bin. The skate rollers conveyor 220, upon which the skid and boxes are conveyed, is also shown. Also shown in this view is a support brace 107 which is used as a stabilizing member for the overall remote vehicle chassis. Frame 105 that bridges the pair of upright frame members 102 is also shown.

Figure 3:
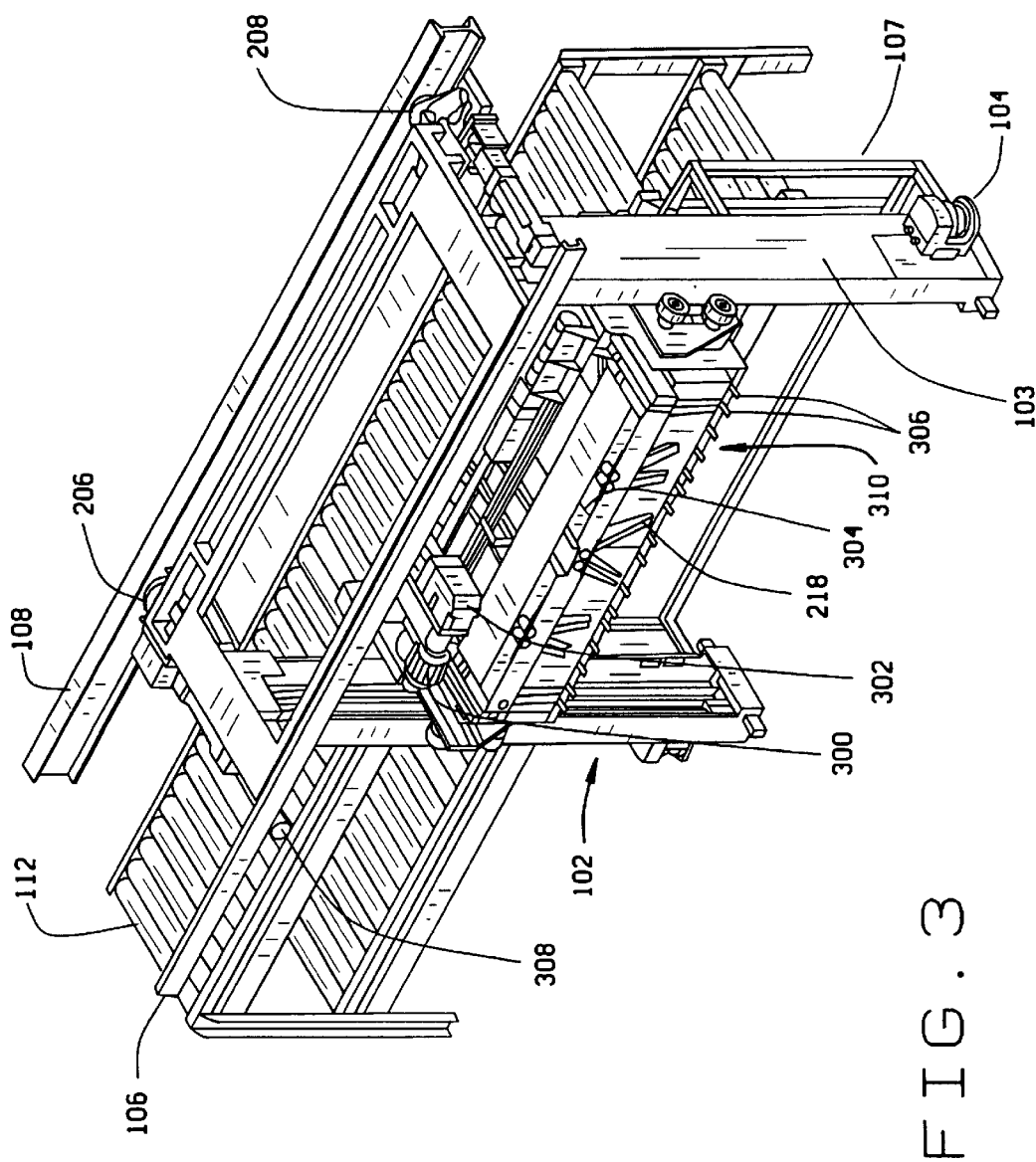
FIG. 3 shows a top—right rear perspective view of the remote vehicle and a portion of the conveyor system.

Referring to FIG. 3, a top right rear perspective view of the remote vehicle 102 and a portion of the conveyor system 112 is shown. Also shown in this view are the overhead rails 106 and 108 which are engaged by track wheel members 206 and 208. The right side of the remote vehicle 102 can be seen and a view of the support bracket 107 and the collision of avoidance sensor 104 can be seen. This rear perspective view reveals skid conveyor drive gear 300 which is operatively connected to skid drive motor 302. Gear 300 engages gear 226 seen in FIG. 2 thereby providing power to conveyor 222 seen in FIG. 2 for conveyance of empty skids to the rear-most position of the bin for retrieval. This gear can also be used to engage a gear on the picking side (similar to gear 226) of the bin system which also powers the conveyor when empty skids are stowed on rack 224. Also seen in this view is a slot or recessed volume 304 where the plurality of fingers 218 are stowed when fully retracted.

Also shown in this view is the carriage, where a plurality of carriage skid tracks (not seen on this view) extend beyond the carriage forming a plurality of prongs 306 such that when the carriage is extended in the direction of the stowed boxes the plurality of skid track prong members 306 will push up against the lower row of boxes such that the lower row of boxes do not move when boxes from the higher row are being removed. Also, the engaging of these plurality of carriage prong members against the lower row of boxes help to stabilize the carriage when loading and unloading boxes from the carriage platform. A discussion of how the entire carriage 310 is extended outward such that the prongs will engage an adjacent body such as a box or retracted will be discussed in more detail when the carriage is described in detail. An absolute encoder 308 is also shown that measures the distance traveled by the remote vehicle by monitoring the numbers of rotations of its wheel.

Figure 4:
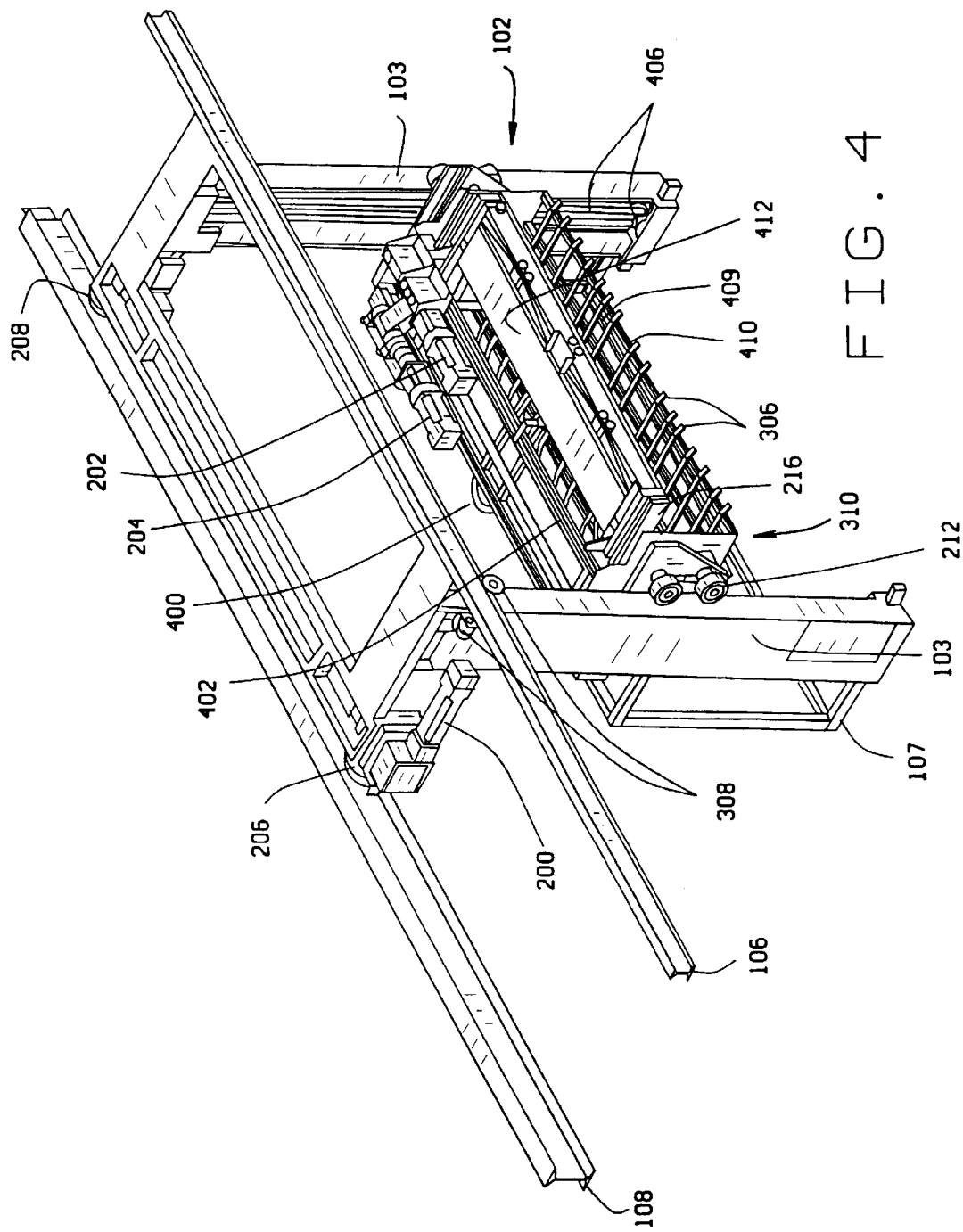
FIG. 4 shows a top—left rear perspective view of the remote vehicle.

Referring to FIG. 4, a top left rear perspective view of the remote vehicle 102 is shown. The remote vehicle 102 is shown suspended from rails 106 and 108. The remote vehicle wheels 206 and 208 engage rail 108 such that the remote vehicle 102 translates along said rail. Also seen in this view is the rear view of the carriage 310 of the remote vehicle, the rear view being the side closest to the flow through storage bins on the picking side of the bins.

A flexible communication and power bus 400 is shown. The power and communication bus 400 is electrically connected to the arm and finger assembly 412. The communication and power bus 400 provides power and control commands to the finger bridge frame assembly 412 whereby the fingers are selectively controlled to perform the picking and lumping functions. Bus 400 communicates by way of the power and communication strip 402 electrically connected to an on-board controller. Communication strip 402 also acts as a support structure for the communication cabling. The on-board controller is adapted to receive task assignments from a central process controller.

Also shown in this view are the pair of opposing upright side frame members 103 which house the pulley system 406 whereby the carriage is elevated up and down. The left upright frame member is seen in the foreground of this view and the right frame member is seen in the back ground. Also shown in this view are the plurality of support bars 410 for forming the carriage platform. Also shown in this view are the plurality of the carriage skid rails 409 which are attached to the top side of the support members 410.

Figure 5B:
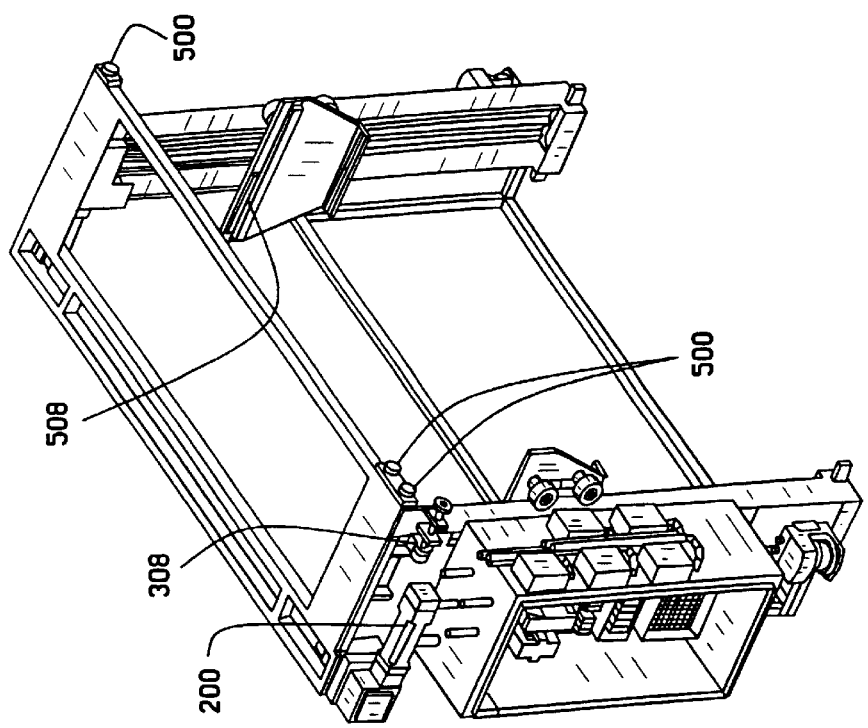
FIG. 5B shows a top—left rear perspective view of the remote vehicle frame.
Figure 5A:
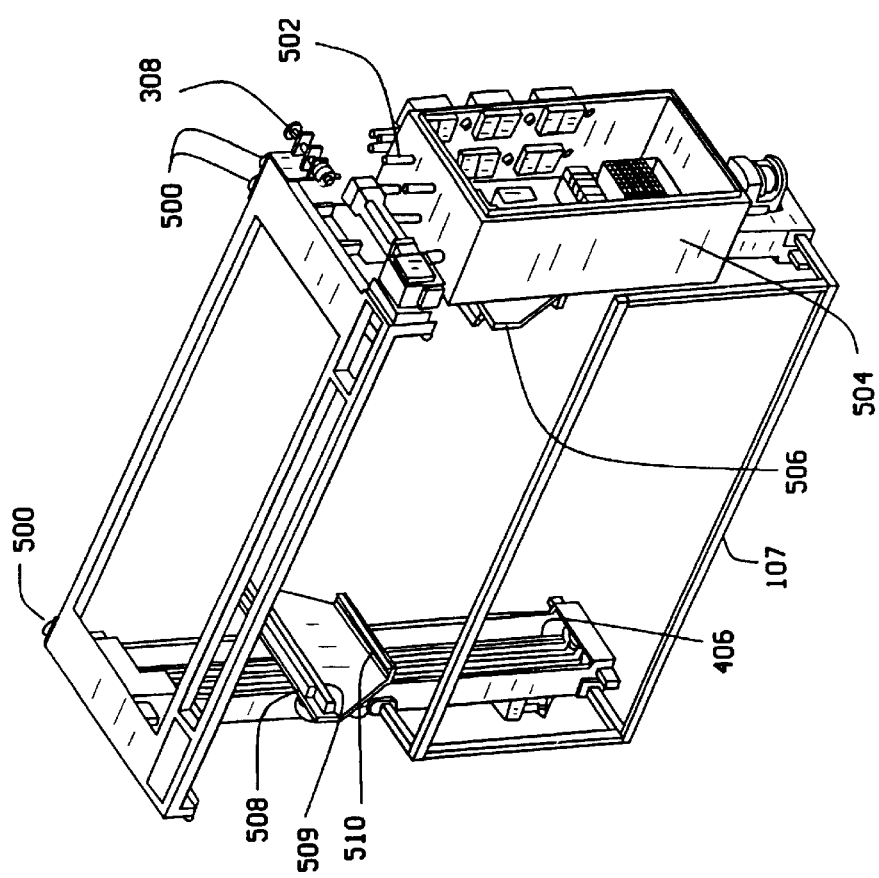
FIG. 5A shows a top—left front perspective view of the remote vehicle frame.

Referring to FIGS. 5A and 5B, a top left front perspective view of the remote vehicle frame and a top left rear perspective view of the remote vehicle frame are shown. Shown in FIG. 5A are a set of three wheels 500 which are designed to engage the overhead track rail 106. Members 502 are electrical lines exiting the electrical box 504 are shown. The electrical box 504 for the remote vehicle houses the on-board controller and communication systems. A better view of the pulley system 406 is shown which provides the elevator for the carriage. Also shown is a pair of carriage brackets 506 which support the carriage 310 and is operatively connected to the stabilizing wheels 212 and is operatively attached to a pulley system 406 whereby the lowering and the elevating of the carriage is accomplished. The carriage has a plurality of wheels (see 624 of FIG. 6) that are disposed on either side of the carriage frame that engage carriage track 509 thereby allowing the carriage to travel along the track 509. This function allows the carriage to extend its platform in a direction of a box to be retrieved or toward a platform where a box is to be transferred. The support carriage bracket 506 has integral with it a flange 510 which supports the carriage. Also the bracket 506 incorporates a carriage rack member 508 having pinion interfacing teeth which is communicable with a mating carriage pinion drive gear 610 (see FIG. 6) on the carriage thereby allowing the carriage to extend forward and backward.

Figure 6:
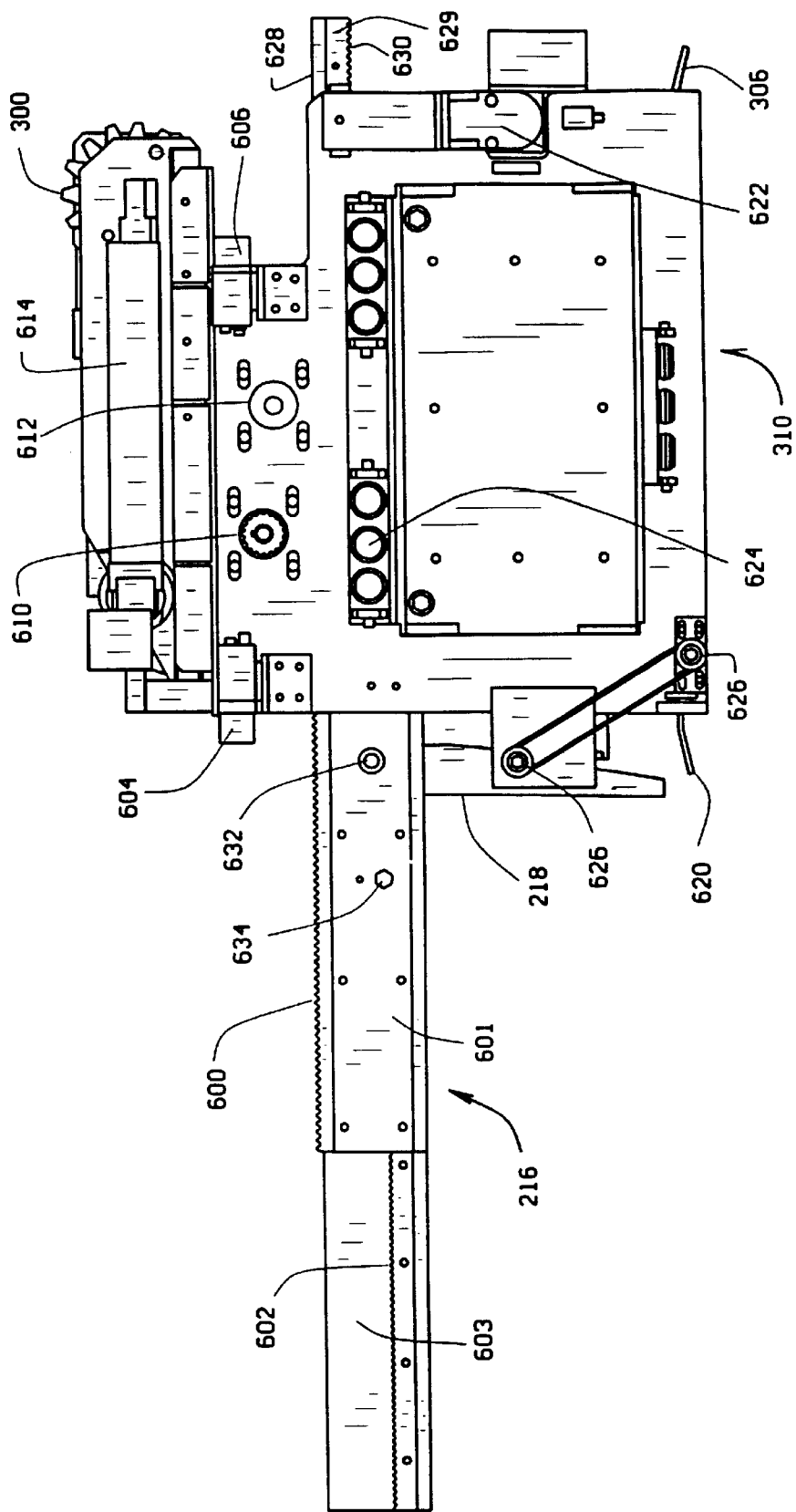
FIG. 6 shows a left side view of the carriage with the pinioned telescoped arm rail fully extended to the front.

Referring to FIG. 6, a left side view of the carriage 310 with the pinion driven telescoped arm rail 216 fully extended to the front. The pinion driven telescoped arm 216 is shown in its fully extended front position with the mechanical finger members 218 extended downward which is the position of the arm and mechanical fingers when the combination has fully displaced a box off of the carriage platform onto the conveyor 112 (see FIG. 1). The arm 216 comprises an outer arm rack member 601 and an inner arm rack member 603. The two rack members 601 and 603 are adjacent to one another and are connected by a telescoping tongue and groove interface such that the two rack members translate with regard to one another in a telescoping fashion. There are left and right inner arm rack members 603 and left and right outer arm rack members 601. The left and right inner/outer telescoping arm pairs are attached by a bridging member such that the left and right arms are extended and retracted in unison. It is noted that there is a left and right rack and pinion telescoping arm 216. The left and right arms operate in the same manner. Therefore, for the purpose of this specification, one reference number is used to identify both the left and right members of the arm 216. The telescoped rack members 601 and 603 have a plurality of pinion interfacing teeth 600 and 602 that engage their respective pinion drive gear members whereby said gears control the extension and the retraction of the arms. Item 612 is the axle connection to the carriage chassis on which a pinion drive gear rotates for the outer rack and pinion drive gear 902 interface (see FIG. 9) which engages the plurality of pinion interfacing teeth 600. Pinion gear 902 is used to drive outer rack arm 601. Item 632 shows the axle connection of the inner rack pinion gear 1010 (see FIG. 10b) to the outer rack arm, about which it rotates freely. The inner rack pinion gear 1010 engages the inner rack and pinion interfacing teeth 602 of the inner rack 603 and the fixed rack pinion interfacing teeth 630 of fixed rack 628. This doubling engagement between the teeth 630 of the fixed rack 628 and the teeth 602 of the inner rack arm member 603 act as a drive means for inner arm 603 when the outer arm is actively being driven. Gear 1010 is an un-powered follower which transfers drive to retract and extend arm 603. Member 634 is shown which is an attach point for a stopping means that prevents over extension of the inner arm.

Also shown in FIG. 6, are the digital cameras 604 and 606 which are utilized to identify the individual boxes which are to be lumped and picked. A digital image of the code on a given box is taken and compared to a stored digital image of the correct code.

FIG. 6 also shows a telescoped arm 614 which extends and thereby extends the (skid conveyor drive) gear 300 such that it engages an interfacing skid conveyor gear 226 (see FIG. 2) on the flow through bins that allows the stowing and retrieval of empty skids.

Item 628 of FIG. 6 is a fixed pinion rack having teeth members 630. The fixed rack pinion interfacing teeth members 630 engage an interfacing inner rack and pinion gear 1010 thereby providing a means for the inner rack arm to move forward and backward along said fixed pinion rack 628. Item 629 is a guide means for arm 601.

Member 624 is one of a plurality of wheels or bearings that engages the carriage bracket track 509 (see FIG. 5) as discussed previously. The entire carriage 310 can translate forward or backward along said tracks 509. Carriage pinion gear 610 provides the drive means to allow the carriage to translate front and back by engaging carriage rack member 508 (see FIG. 5).

The skid track prongs 306 and 620 of the carriage platform extend just beyond the platform such that they engage stationary objects adjacent to the carriage when the carriage is extended forward and backward along the rack 508. When the plurality of prongs 306 and 620 engage an adjacent fixed object the carriage is thereby stabilized by said engagement. Also during the picking operation the plurality of track prongs 306 will engage the side of a lower box when a box that is stacked on top of the lower box is being removed by the item handling system. This engagement provides a two-fold purpose in that it stabilizes the carriage but also it prevents the lower box from moving due to the force of friction caused by the translation of the box that is stacked on top of the lower box. A fifth motor 622 is shown which is the drive means for the skid ejector pulley means 626 which will be detailed further when referencing FIG. 6A.

Figure 6A:
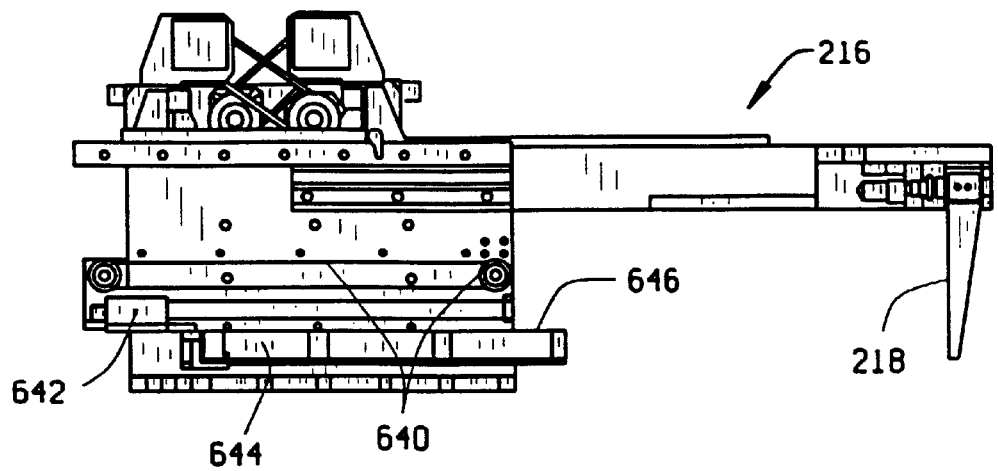
FIG. 6A shows a left side view of the carriage with a portion of the side panel cutaway.
Figure 6B:
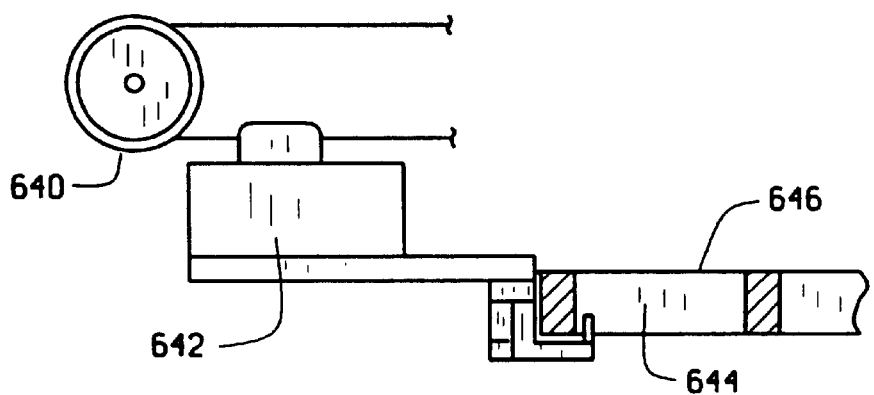
FIG. 6B shows a detail of the hook for the skid pulley ejector system.

Referring to FIGS. 6A and 6B, the details of the skid handling system is shown. FIG. 6A exposes the internal pulley ejector system 640 which positions the pulley ejector hook 642 to hook an empty skid and pull it onto the carriage platform. The hook 642 hooks in a recessed area 644 on the bottom side of the skid 646. FIG. 6B details the hook 642 to skid 646 interface. In operation, the hook is advanced toward a stowed skid and the hook is positioned slightly beneath the skid and is raised to hook in a recessed area of the skid. The hook is advanced by using the pulley system and extending the carriage. The vertical position of the hook can be varied by raising or lowering the carriage. Once the hook is in the recessed area, the hook can be retracted by the pulley thereby pulling the skid onto the carriage platform.

Referring to FIG. 7, a left side view of the carriage with the pinion driven telescoped arm in the fully stowed position.

Figure 8:
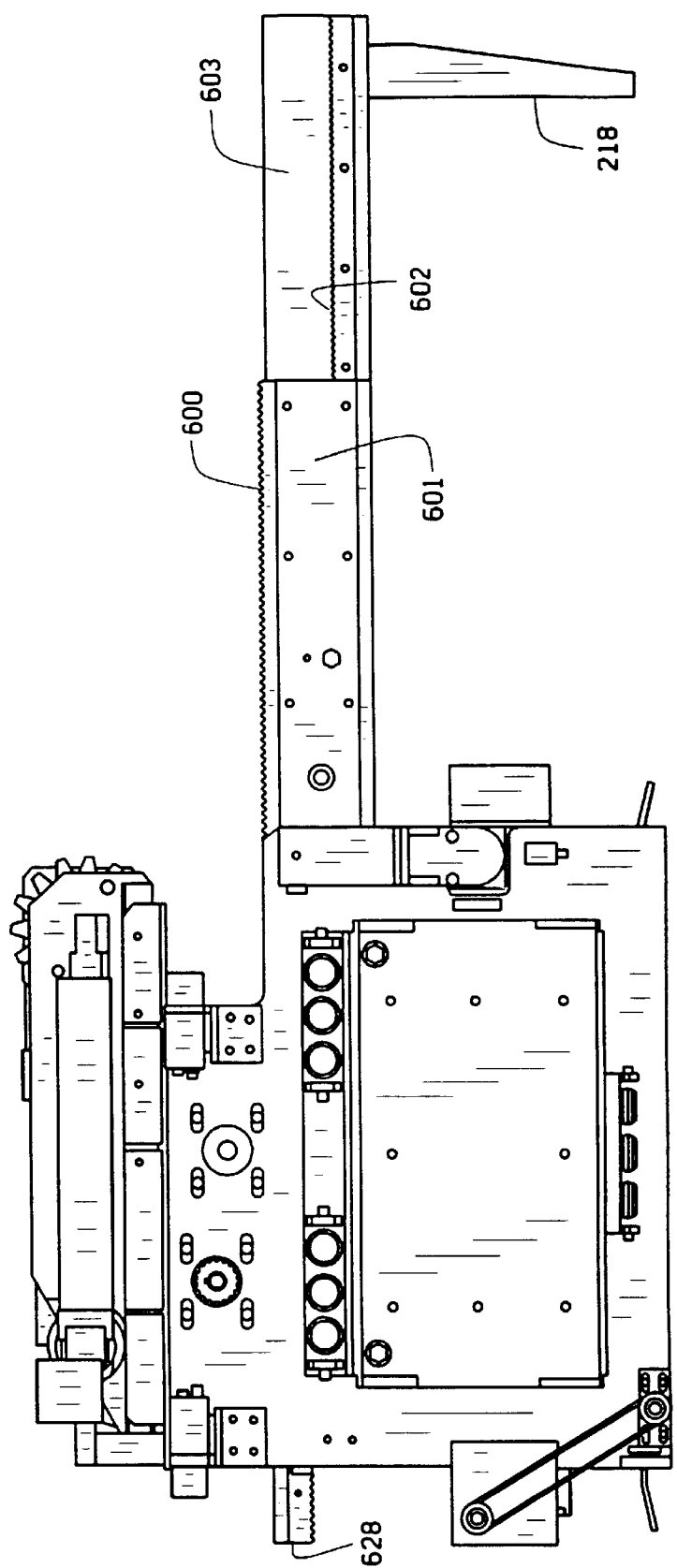
FIG. 8 shows a left side view of the carriage with the arm extended to the rear.

Referring to FIG. 8, a left side view of the carriage is shown with the telescoped pinion driven arm fully extended to the rear to a position whereby the finger members 218 can be lowered behind a box to be picked out of the flow through storage bins.

Figure 9:
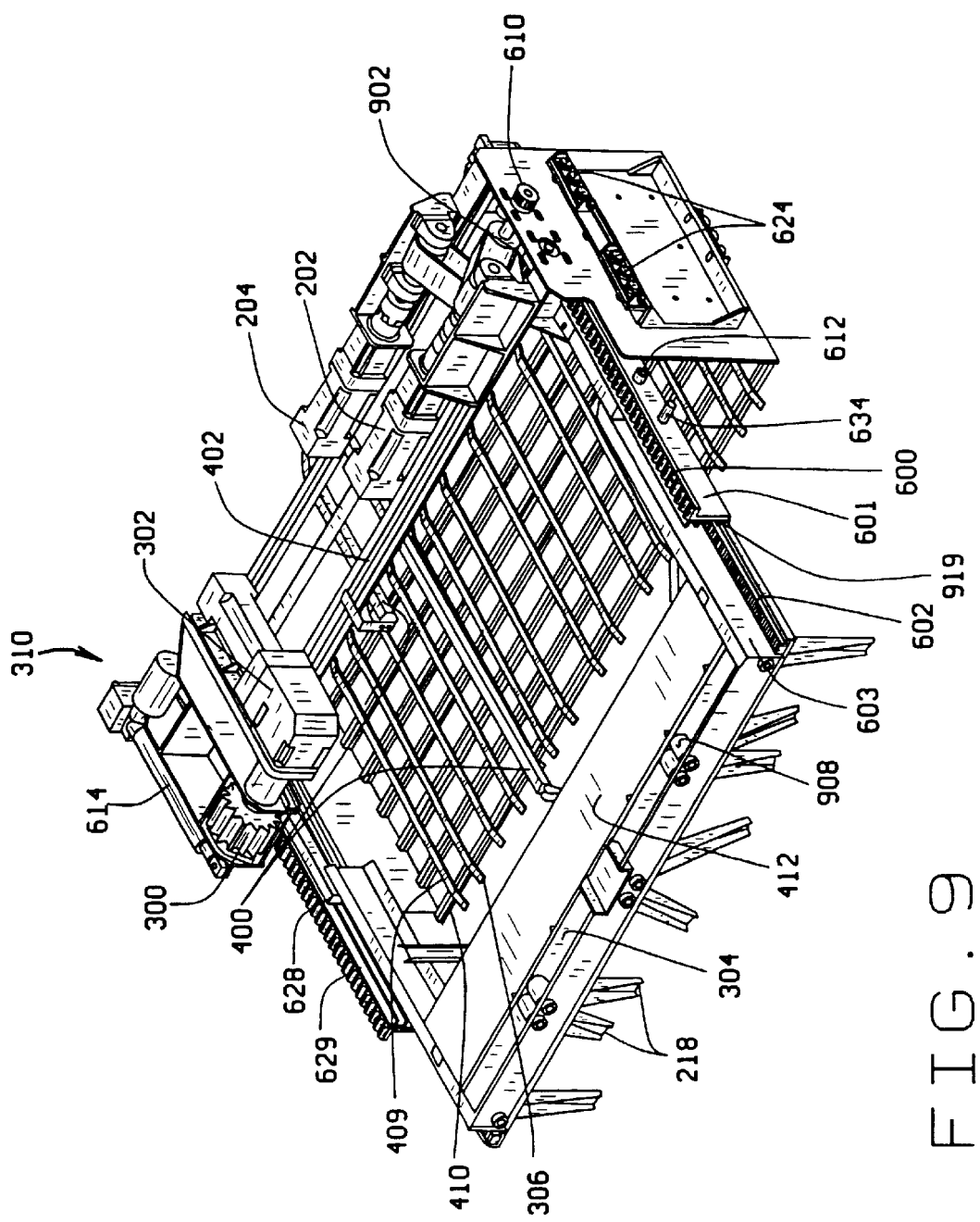
FIG. 9 shows a top right side rear perspective view of the carriage.

Referring to FIG. 9, a top right side rear perspective view of the carriage 310 is shown. The carriage platform performs multiple functions for the overall item handling system. The primary functions are retrieving boxes from the flow through storage bins and storing boxes in the flow through storage bins. The carriage system 310 incorporates multiple electrical motors that power various functions within the carriage system. A third carriage motor 202 powers the carriage pinion gear 610. Pinion gear 610 is the pinion interface for the rack and pinion mechanical system that allows the carriage to translate along carriage rack member 508 rack (see FIG. 5) for backward and forward movement of the entire carriage system. A second electrical arm motor 204 powers the pinion gear 902. Pinion gear 902 is the power source for the rack and pinion telescope arm system that allows for retrieval and placement of boxes.

The rack and pinion arm system entails outer/inner arm telescoped rack members 601 and 603. There are two such arm systems within the carriage system that are disposed on opposing sides of the carriage. As stated previously, each arm has two rack members 601 and 603. The rack members have a telescoping interface along the tongue and groove junction 919. This tongue and groove junction 919 provides for the telescoping alignment of the two rack members 601 and 603. Outer arm rack member 601 maintains a telescoping alignment with the overall carriage chassis by way of an arm guide tongue and groove junction 629. The arm guide member 629 makes up the tongue portion of the tongue and groove junction and acts as a support and alignment member for the inner rack arm member 603. Rack arm members 601 and 603 both have a plurality of pinion interfacing teeth, 600 and 602 respectively, to form the rack and pinion interface. Therefore, the complete rack and pinion interface consists of the pinion drive gear 902 which interfaces with the pinion interfacing teeth 600 thereby driving the translation of rack member 601. Rack member 601 also consists of a pinion following gear (not shown) which is attached to rack 601 by an axle member 612. The inner rack and pinion following gear 1010 (see FIG. 10B) rotates about said axle 612. The pinion gear 1010 engages the plurality of pinion interfacing teeth 602 of rack member 603. Simultaneously, the pinion gear 1010 engages the pinion interfacing teeth 630 of fixed rack member 628, referring to FIG. 6. Therefore, the drive power provided by pinion gear 902 is transferred by way of pinion gear 1010 attached by axle 612 to rack member 603 because of the engagement to the plurality of pinion interfacing teeth 602 and the pinion interfacing teeth 630 of the fixed rack member 628. The telescoping rack arm as described will move in conjunction with the identical telescoping arm that is disposed on the opposite side of the carriage assembly. This is made possible by the bridging arm and finger frame assembly 412 which connects the two opposing arms.

The bridging frame member has a plurality of mechanical finger members 218 attached. The mechanical fingers are attached to the bridge arm and finger assembly member 412 at a point within a recessed volume 304 of the bridge frame member. The plurality of fingers 218 are attached by axle members 908. The finger members 218 are adapted to rotate by a drive means about said axle member 908. The finger members 218 are powered by independent electrical motors housed within the bridge frame member 412. Each finger member motor is independently controlled. The finger members" rotation is fully variable within a range of 0 to 90°. The 0° position is in the fully retracted position whereby the finger member is positioned within the recessed volume 304. The 90° is the position when the finger member is rotated fully down at a right angle to the bridge frame member 412. Control for the finger members and the electrical power is provided by the bus interface line 400. The bus interface 400 is a flexible cable assembly that electrically interfaces to the motors within the bridge frame member 412. The bus line interface 400 receives its electrical interface from the communication strip 402 and support structure which is in connection with the on-board controller.

The carriage platform consists of a plurality of parallel skid tracks 409. The skid tracks 409 are supported by a plurality of parallel crossing members 410. The skid tracks 409 extend beyond the plurality of support members 410 to form a plurality of prongs 306. The prongs 306 are utilized to press against stationary boxes or other objects as described previously. The plurality of prongs are also used when a box is being removed from a top row of boxes. During this transaction the prongs are pressed against the boxes on the lower row when a box is being removed from the top row. This prevents the bottom box from sliding due to the friction interface between the top box and the bottom box.

Skid conveyor drive gear 300 is powered by skid drive motor 302. Skid conveyor drive gear 300 is utilized to engage an interfacing gear 226 which is operatively attached to the belt conveyor 222 (see FIG. 2) which stows empty skids. The gear 300 is attached to the telescoping rod 614 such that the gear can be extended forward towards an interfacing gear 226 (see FIG. 2) such that engagement can be obtained.

Here, in FIG. 9, the telescoping outer and inner arms 601 and 603 are shown full y extended off the rear of the carriage. Referring to FIG. 10 the same view of the carriage is shown with the arm retracted to a center position. Also FIG. 10 shows the finger members 218 in their fully retracted 0° position within the recessed volume 304 of the arm and bridge frame assembly 412.

Figure 10A:
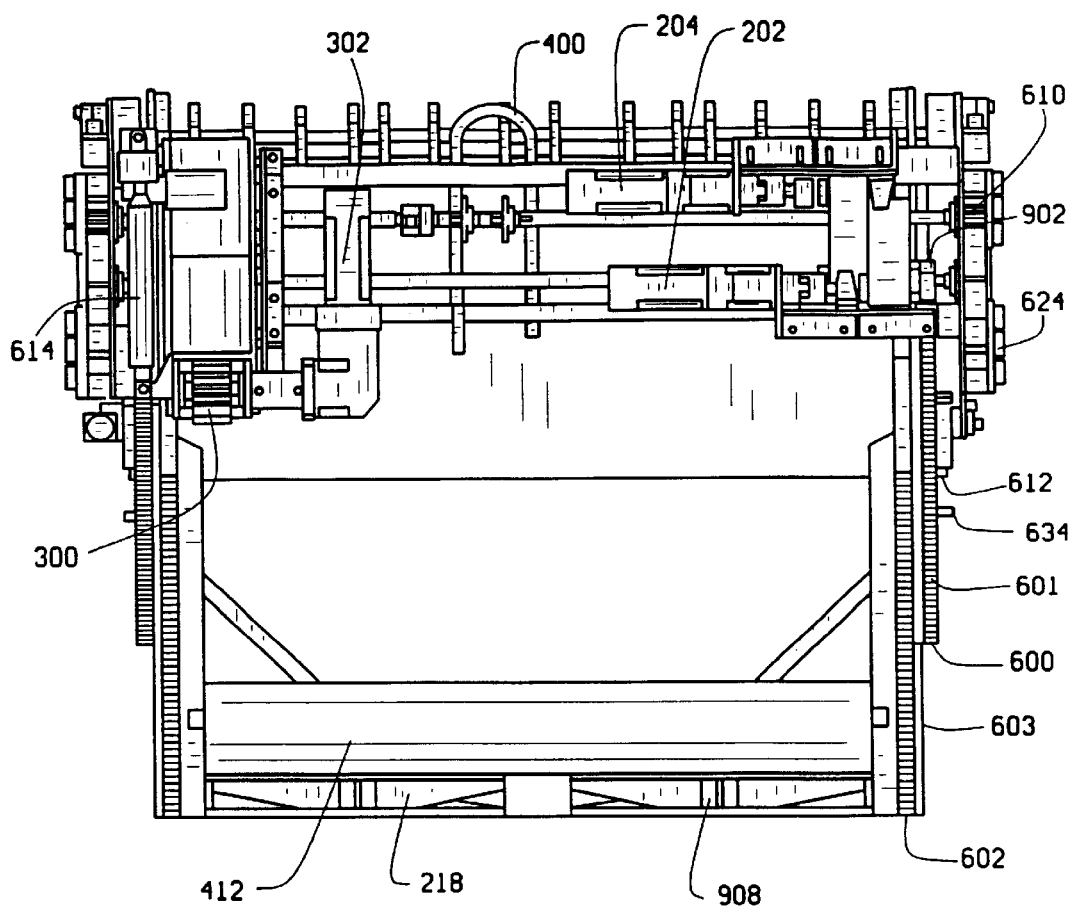
FIG. 10A shows a top view of the carriage with the arm extended to the rear.
Figure 10B:
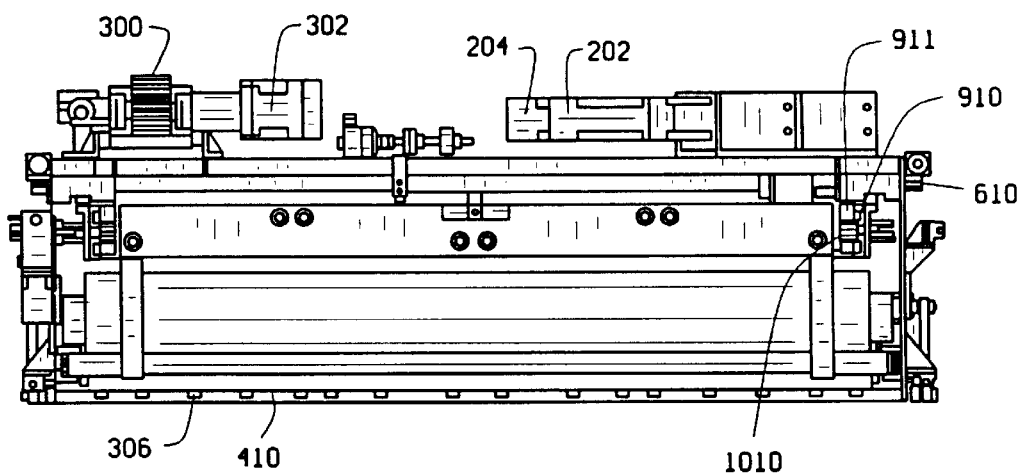
FIG. 10B shows a rear view of the carriage.

Referring to FIGS. 10A and 10B the top and rear views of the carriage is shown. The pinion gear 1100 is more clearly shown in FIG. 10B. The fixed rack member 628 interface to gear 1010 is also more clearly shown by this view. The alignment of gear 902 with arm 601 is more clearly shown in FIG. 10A.

Referring to FIG. 11 a right front perspective view of the flow through bin (with a portion of the frame members cut away for clarity) is shown . The flow through bin system 1100 consists of a plurality of frame members that are both vertically and horizontally orientated and that are attached in such a manner to create a bin space for storage of boxes. This flow through bin system 1100 as shown in FIG. 11 has two bin spaces 1102 and 1104 which are vertically orientated with respect to one another. Each flow through bin 1102 and 1104 incorporate a pair of skate roller track conveyor members 220. The skate roller track conveyor 220 has a downward grade toward the front end of the flow through bin and this downward grade allows items resting on the skate conveyor to convey toward the front end of the flow through bin. The skate conveyor consists of a pair of rail members and a plurality of skate roller members 1108. A skid, as shown by item 1110, rests on top of the skate roller track conveyor 220. Boxes (not shown in this view) are stacked on top of skid 1110 two or more rows high. Therefore, there are typically at least two rows of boxes that are stacked on top of skid 1110 and the rows of boxes are typically three to four boxes wide. The downward grade of the skid roller track conveyor 220 causes the skid and the boxes resting on top of the skid to convey toward the front of the flow through bin until it engages a skid index lifting mechanism (see FIG. 13). When all the boxes have been removed from a skid 1110, the skid is removed from the flow through bin and stowed in stacked racks 1112 or 1114 of empty skid stow rack 224. The skid 1110 is removed from the flow through bin by extending hook 642 (refer to FIG. 6) of the carriage system under the skid such that the hook member hooks at a recessed area 644 (see FIG. 6) on the bottom side of said skid and then the hook is retracted thereby pulling the skid onto the carriage platform. The telescoping arm and finger combination can be used to assist in pushing the skid off the carriage into one of the stacked racks 1112 or 1114 of the skid storage rack 224. The carriage can then extend gear 300 to engage gear 226 of the storage bin to power the skid conveyor thereby conveying the skids to the desired rear-most position.

The empty skids that have been stowed in stacked racks 1112 and 1114 can be retrieved from said racks by utilizing the skid hook. The conveyor belt 222 can be powered by engaging gear 226 with a driving mechanism. Therefore, gear 226 is engaged by a mating drive gear thereby powering conveyor belt 222. Conveyor drive belt 222 has dog members that can be positioned behind an individual skid such that the skid can be pushed to the rear most position of the rack 1112 or 1114. Therefore, when an empty skid is required due to the fact that all skids are at maximum capacity, an empty skid can be retrieved from the rack 1112 or 1114 and reinserted into the flow through storage bin utilizing the skid hook and the telescoping pinioned arms and finger members as needed.

Figure 12:
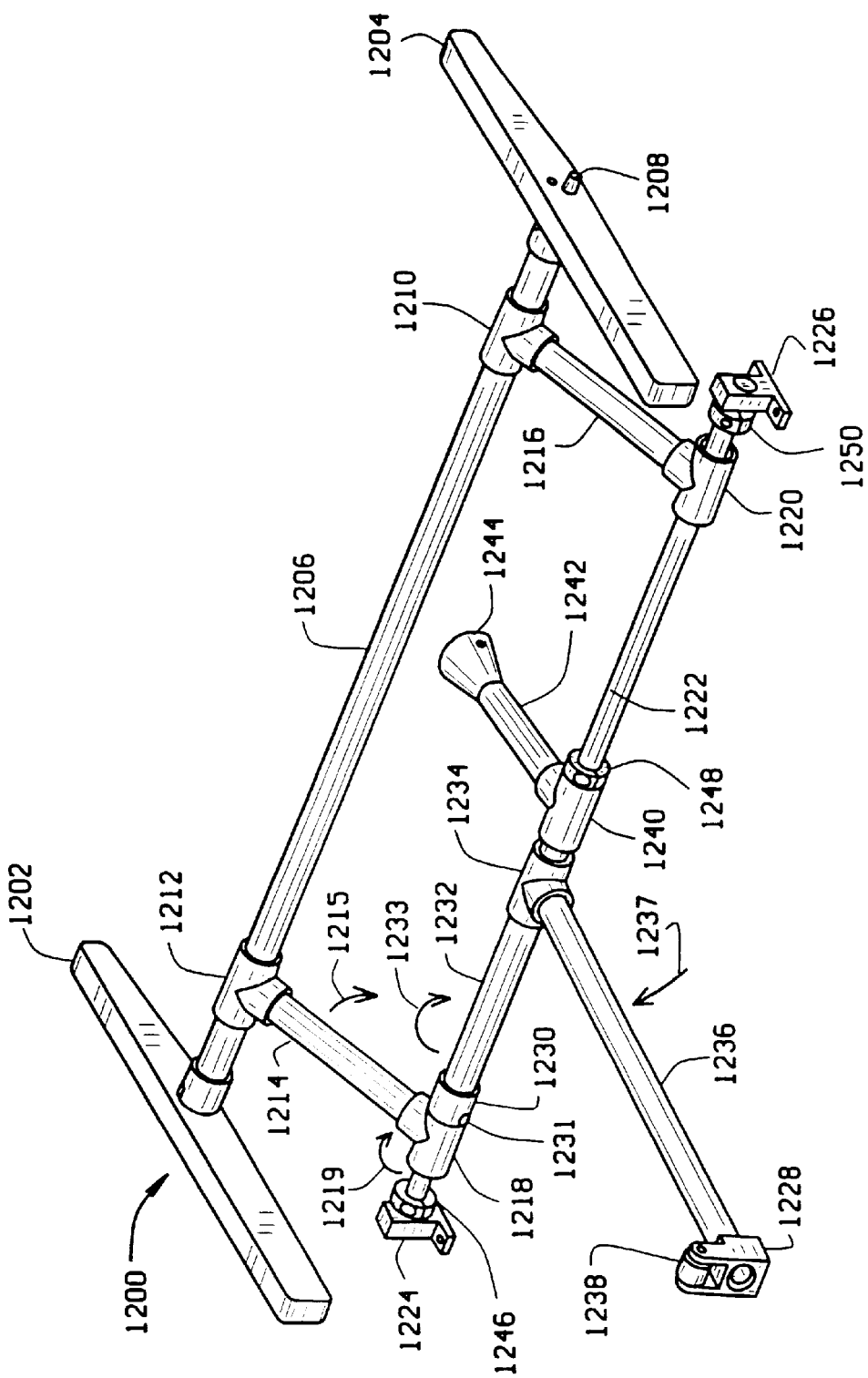
FIG. 12 shows a right rear perspective view of the skid index lifting mechanism.
Figure 13:
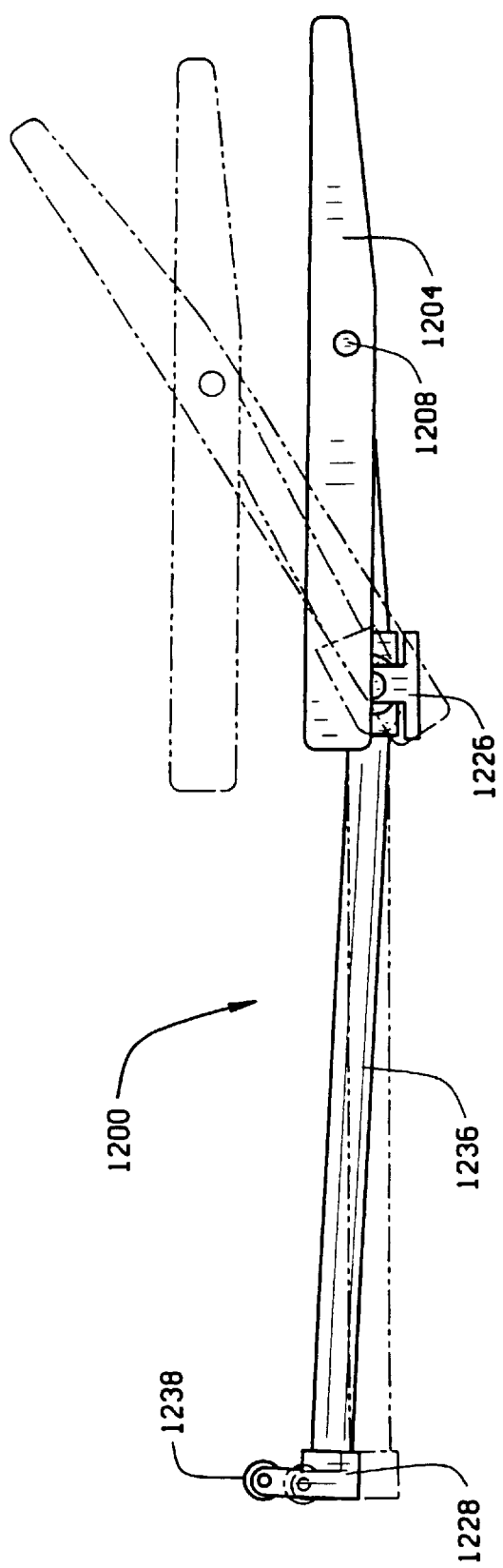
FIG. 13 shows a right side view of the skid index lifting mechanism.

Referring to FIG. 12 and FIG. 13, a rear right side perspective view of the skid index lifting mechanism and a right side view are shown, respectively. The skid index lifting mechanism is an integral part of the flow through storage bin system. The skid index mechanism is utilized to maintain a gap between the skid of boxes in the front picking position and the next skid of boxes in line for picking. The mechanism comprises a skid lifting portion that triggers a skid indexing portion. The skid lifting portion is a spring loaded mechanism (or some other mechanism to generate an upward lifting force like a weighted balance) that is depressed when a skid with boxes placed on it is conveyed to the front picking position thereby placing the skid weighted down with boxes on top of the lift mechanism whereby the depression of the lift mechanism triggers the indexing portion to stop the conveyance of the next skid thereby leaving adequate space between the front skid and the next skid in line. This space allows mechanical fingers or other mechanical devices to be lowered behind boxes in the picking position. When the last box is removed from the front skid, the weight of the empty skid is overcome by the force of the lift mechanism thereby slightly raising the empty skid for removal. Once the empty skid is removed thereby removing all weight from the lift mechanism the indexer is released to allow the next skid loaded with boxes to be conveyed to the front position on top of the lift mechanism thereby depressing the lift mechanism and triggering the indexing means.

In the preferred embodiment, skid indexing mechanism 1200 comprises several parts. There are two parallel first and second glide members 1202 and 1204 spaced apart and connected there between by a bar member 1206 that perpendicularly extends between the glide members. Each of the two glide members are attached on opposing ends of the bar member by an axle member 1208 about which the glide rotates. Axle member 1208 can optionally co-axially extend continuously through bar member 1206 and rotate freely within said bar member and glide members 1202 and 1204 affixed thereto. As a second alternative, glide members 1202 and 1204 can have separate independent axle members. However, it is preferred that the glide members rotate synchronously with respect to one another. Therefore, an axle member that co-axially extends continuously through bar member 1206 is a preferred embodiment. In the preferred embodiment each of the glide members has its center of gravity offset to one side of the respective axle members. Therefore, when the skid is removed the glides tilt downward on the side closest the oncoming conveyance of skids, thereby positioning the glide member for the next skid. The bar member is threaded through a pair of first and second T-shaped bushing members 1210 and 1212 which provide the junction between the bar member and the pair of lift arms 1214 and 1216. The leg portion of each of the two T-shaped bushing members 1210 and 1212 are adapted to receive lift arms 1216 and 1214 as shown in this embodiment as a cylindrical tube co-axially received into an opening of the leg of the bushing. Each of the lift arms are co-axially joined on the opposing end to the legs of T-shaped bushings 1218 and 1220. T-shaped bushing 1218 co-axially surrounds axial bar member 1222. Axial bar member 1222 extends between a pair of bearings 1226 and 1224 and is co-axially threaded through T-shaped bushing 1220; T-shaped bushing 1240; T-shaped bushing 1234; transfer bar member 1232; and T-shaped bushing 1218.

T-shaped bushing 1218 has a keyed lift transfer tab adapted to insert into keyed slot 1231 of lift transfer sleeve 1231 which is firmly attached to transfer bar 1232 where said transfer bar 1232 is firmly attached on the opposing end to an arm of T-shaped bushing 1234. The leg of T-shaped bushing is in turn firmly attached to indexing bar 1236. Therefore, when lift arm 1214 is pushed downward in the direction of arrow 1215, the T-shaped bushing 1218 is rotated about axial member 1222 in the direction of arrow 1219 thereby forcing the keyed lift transfer tab against a side of the keyed slot 1231, thereby forcing the rotation of sleeve 1230 and transfer bar 1232 about axial bar 1222 in the direction of arrow 1233. This rotation forces the indexing arm 1236 upward in the direction of arrow 1237, thereby spacing back the next oncoming skid of boxes with indexing member 1228. Transfer bar member 1232 is threaded through bushings 1240, 1234 and sleeve 1230 and is firmly attached to each. Bushings 1218 and 1220 rotate about axial bar member 1222 on a spring-loaded bearing where the spring loading is such that it applies a force to rotate lift arms upward when no opposing load is provided. Bar member 1222 acts as an axle member that is attached to a pair of bearings 1224 and 1226 on opposing ends. Indexing arm 1236 is raised or lowered based on the glide member position. When the lift arms are pushed downward due to the weight of the skid the indexing arm is triggered to lift up to prevent the next skid from conveying forward. Referring to FIG. 13, when the skid is empty the lift arms are raised and when the skid is removed the glides rotate downward and the indexer is lowered allowing the next skid to convey forward.

The sequence of events is such that when a skid, containing boxes thereon, is resting on the two parallel glide members 1202–1204, and the glide members, along with bar member 1206 is forced downward. Bar member 1206 is welded to the pair of T-shaped bushing members 1210 and 1212. The pair of lift arms 1214 and 1216 extend from the legs of the T-shaped bushing 1212 and 1210 to a second pair of T-shaped bushings 1218 and 1220 on the opposing side. The second pair of T-shaped bushings, 1218 and 1220, each rotate on a spring-loaded bearing member about an axle member 1222. The crossing axle member 1222 extends between the pair of bearing members 1224 and 1226. The rotation of the second pair of T-shaped bushing members 1218 and 1220 about the axle member 1222, is caused by a pair of spring-loaded bearing members where the force of the spring causes an upward rotation of the second pair of T-shaped bushing members, such that the lift arms are rotated upward. However, as noted when a skid with boxes thereon is resting on the pair of parallel guide members, the pair of parallel guide members, along with the lift arms, are forced downward because the force of the spring-loaded bearing is overcome. As the lift arms are rotated downward, and likewise the second pair of T-shaped bushings are rotated downward, the indexing arm at 1236 is rotated upward and the indexing member, 1228 prevents the next skid from advancing. The upward rotation of indexing arm 1236 is accomplished by the interface between the notched sleeve 1230 and one of the second pair of tabbed T-shaped members 1218. The T-shaped member 1218 has a protrusion, or tab (not shown) that extends into a drilled slot 1231 of sleeve 1230 such that when the T-shaped member 1218 is rotated, there is a related rotation of the slotted sleeve 1230 when the tab or protrusion of T-shape bushing member 1218 contacts a sidewall of the drilled slot, thereby forcing rotation of the slotted sleeve and all other members fixed thereto. Slotted sleeve 1230 is attached to transfer bar member 1232 which, in turn, is attached to lift arm 1236 by T-shaped bushing 1234. It is this interface that causes the indexing arm 1236 to rotate upward when the lift arms and parallel glide members are forced downward. Once all boxes have been removed from the skid, the rotational force of the spring-loaded bearing member is capable of lifting the skid sufficiently for removal. Once the skid has been removed, the spring forces the lift arms and parallel glide members to their most upward position. This rotation of the lift arms to the most upward position, allows the transfer bar member 1232 and indexing arm 1236 to freely rotate downward about axle member 1222, thereby allowing the next skid load of boxes to advance to the most forward position. Once the skid loaded with boxes is at it most forward position, they are resting on the parallel glide members thereby forcing the glide members to rotate downward along with the lift arms. This, in turn, allows the indexing arm to be raised upward to prevent the advancement of the subsequent skid.

Indexing member 1228 is adapted with a roller 1238 to facilitate advancement of an oncoming skid. Counterbalance member 1242 is a counter balance to hold the indexing arm in the upward position. FIG. 13 illustrates the range of motion of the indexing mechanism 1200.

Figure 14:
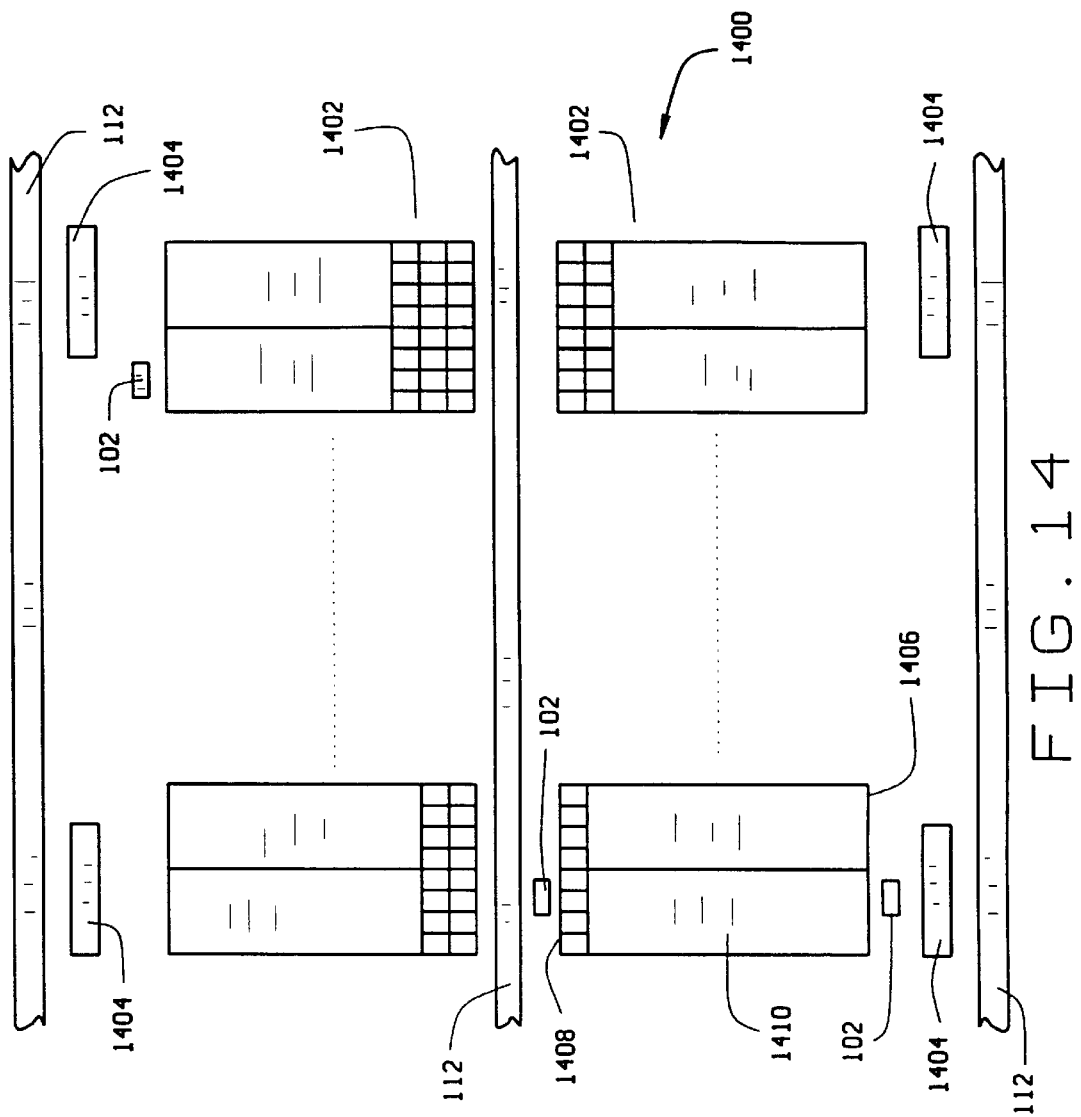
FIG. 14 shows a top view of the typical storage area layout for a flow through storage bin assembly.

Referring to FIG. 14, a top bird's eye view of the storage area layout 1400 is shown. Two rows of flow through storage racks 1402 are shown. A portion of the conveyor 112 is shown which circles the storage racks. Lumping station 1404 is shown where boxes to be lumped are kicked off the lumping conveyor to the designated lumping station. A remote vehicle 102 will retrieve the item from the lumping station and lump it in the appropriate bin. The lumping end 1406 and the picking end 1408 of the flow through bin 1410 is shown. The boxes are retrieved from the lumping station in the most efficient manner. The key objective is to selectively remove boxes from the lumping station so that the vehicle can have a maximum load of boxes that all go to the same bin or nearby bins.

The operation of the remote vehicle is best understood by describing the operation sequence for the two basic remote vehicle functions, picking and lumping. For picking, once the remote vehicle arrives at the proper bin location on the picking side of the flow through storage bins, the telescoping rack and pinion arms reach into the bin over the top row of boxes. The use of the independently actuated fingers permit anywhere from one to four boxes to be picked from a bin row depending on the order requirements. The last skid of boxes on the picking side, which is the forward most skid, is spaced out approximately four inches from the rest of the skids to the rear of the bin to permit the independently actuated fingers to be inserted down behind the boxes for picking. Once the appropriate number of independently actuated fingers have been lowered behind the appropriate number of boxes, the telescoping arm is retracted thereby pulling the boxes onto the remote vehicle carriage. The carriage is then elevated to the proper vertical position for discharge of the boxes to one of the picking conveyors. Once the carriage is positioned for discharge, the telescoping arms continue to retract across the table and thereby discharging the boxes from the remote vehicle carriage onto the picking conveyor.

When picking a large number of boxes from a single location this sequence of positioning the carriage to the first available row of boxes in the selected bin, pulling boxes onto the carriage, repositioning the carriage to the conveyor and then discharging the boxes is repeated sequentially until the required number of boxes is removed from the flow through storage bin. However, orders may require less than a full row of boxes to be removed from a bin. Therefore, the local central process controller will keep a record of the boxes remaining in the first bin stack so that the remote vehicle will know where to start removing boxes the next time it is sent to that particular bin.

On the lumping side of the operation, the sequence is similar, but there are some differences which must be dealt with. One difference is that at a single lumping station there may be more than one product arriving at a given time. This means that the remote vehicle may need to selectively remove boxes from the lumping conveyor so that it can load boxes that all go to the same bin. If there are not enough boxes to fill the remote vehicle carriage that need to go to the same bin, the remote vehicle would then select boxes that are going to nearby bins. The goal of this effort is to minimize the travel requirements and optimize the cycle time for the remote vehicle system. Once the remote vehicle has filled the carriage, it moves to the appropriate bin, positions the carriage at the proper height and discharges the boxes into the bin. In cases where a row has not been filled, the remote would selectively discharge boxes to fill that row and then reposition the table to discharge any remaining boxes.

In view of the foregoing, it will be seen that the stated objects of the invention are achieved. The above description explains the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description shall be interpreted as illustrative rather than limiting. Thus, the breadth and scope of the present invention should not be limited by any of the above-described exemplary embodiments, but should be defined only in accordance with the following claims appended hereto and their equivalents.

All patents, if any, referenced herein are incorporated in their entirety for purposes of background information and additional enablement.

What is claimed is:

1. A skid handling system for a flow through storage facility comprising:
   a) a flow through storage bin having a conveyor operable to convey a skid;
   b) a rack attached to said storage bin and adapted to receive and support an empty skid;
   c) a skid conveyor belt operatively attached to said storage bin and having spaced skid conveyor prongs extending perpendicularly from the belt, said belt positioned so that when the belt conveys, the skid conveyor prongs are positioned adjacent the skid and move the skid along the rack for proper storage; and
   d) a skid conveyor drive interface mechanically engaging said skid conveyor to power said skid conveyor.

2. A skid handling system as recited in claim 1 further comprising:
   a) a remote vehicle having a platform adapted to receive a skid and having a mechanical hook operatively connected to said vehicle and adapted to extend and hook an empty skid and pull onto said platform and push said empty skid off of said platform; and
   b) a skid conveyor drive mechanism operatively attached to said remote vehicle and adapted to drive the skid conveyor drive interface.

3. A skid lift and indexing mechanism for use in flow through storage bins having a conveyor system on which a plurality of spaced apart loaded skids are conveyed comprising:
   a) a lifting mechanism having a spring loaded lift member generating a lift force and said spring loaded lift member adapted to depress when a sufficient downward force is applied to said lift member overcoming the lift force; and
   b) an indexing member operative with respect to the lift mechanism and adapted to elevate at a position between a front skid and a skid immediately rear of said front skid when the lift force is overcome depressing said lift member, wherein a space is maintained between the two skids, and adapted to lower when no sufficient downward force is applied to depress said lift member.

4. The skid lift and indexing mechanism as recited in claim 3 where said lift mechanism further comprises parallel glide members proximately spaced apart and rotateable about a common axle to facilitate conveying a skid over said lift mechanism.

5. The skid lift and indexing mechanism as recited in claim 3 where said indexing member further comprises an upward facing roller to facilitate conveying a skid over the lift and indexing member.

6. A skid handling system for flow through storage comprising:
   a) a flow through storage bin having a skate roller conveyor canted downward toward one end of the bin and operable to convey a skid toward the one end;
   b) a rack attached to said storage bin and adapted to receive and support an empty skid;
   c) a skid conveyor belt operatively attached to said storage bin and having spaced skid conveyor prongs extending perpendicularly from the belt, said belt positioned so that when the belt conveys, the skid conveyor prongs are positioned adjacent the skid and move the skid along the rack for proper storage;
   d) a skid conveyor drive interface mechanically engaging said skid conveyor to power said skid conveyor;

e) a lifting mechanism attached to said storage bin and positioned at the one end and having a spring loaded lift member generating a lift force and said spring loaded lift member adapted to depress when a sufficient downward force is applied to said lift member overcoming the lift force; and f) an indexing member operative with respect to the lift mechanism and adapted to elevate at a position between a front skid and a skid immediately rear of said front skid when the lift force is overcome depressing said lift member, wherein a space is maintained between the two skids, and adapted to lower when no sufficient downward force is applied to depress said lift member.

7. A skid handling system as recited in claim 6 where said lift mechanism further comprises parallel glide members proximately spaced apart and rotateable about a common axle to facilitate conveying a skid over said lift mechanism.

8. A skid handling system as recited in claim 6 where said indexing member further comprises an upward facing roller to facilitate conveying a skid over the lift and indexing member.

9. A skid handling system for flow through storage as recited in claim 6 further comprising:

a) a remote vehicle having a platform adapted to receive a skid an d having a mechanical hook operatively connected to said vehicle and adapted to extend and hook an empty skid and pull onto said platform and push said empty skid off of said platform; and b) a skid conveyor drive mechanism operatively attached to said remote vehicle and adapted to drive the skid conveyor drive interface.

10. A method of lifting and indexing skids for use in flow through storage bins:

a) indexing with an indexing member a first skid immediately rear the indexing member as the first skid is being conveyed toward the indexing member on a conveyor;

b) lifting an empty skid immediately forward the indexing member with a lift mechanism operable to generate a lift force sufficient to lift an empty skid;

c) removing s aid empty skid for storing with a mobile remote vehicle and releasing the first skid from the indexing member responsive to removing said empty skid and conveying said first skid over the lift member, depressing said lift member; and d) indexing with the indexing member a second skid immediately rear the indexing member responsive to depressing said lift member.

11. A method of lifting and indexing skids as recited in claim 10 where said lift mechanism further comprises parallel glide members proximately spaced apart and rotateable about a common axle to facilitate conveying a skid over said lift mechanism, said method further comprising the step of:

rotating one end of said glide members downward for receiving a subsequent skid.

12. A method of handling skids in a flow through storage system comprising:

a) providing a flow through storage bin having a conveyor and conveying skids on said conveyor;

b) receiving an empty skid from said conveyor and supporting the empty skid with a rack attached to said storage bin;

c) moving the skid along the rack with a skid conveyor belt operatively attached to said storage bin and having spaced skid conveyor prongs extending perpendicular from the belt so that when the belt conveys, the skid conveyor prongs are positioned adjacent the skid; and d) driving the skid conveyor with a skid conveyor drive interface mechanically engaging said conveyor.

13. The method of handling skids recited in claim 12 further comprising the steps of:

a) providing a remote vehicle having a platform adapted to receive a skid and having a mechanical hook operatively connected to said vehicle;

b) extending said hook and hooking an empty skid and pulling onto said platform;

c) pushing said empty skid off said platform into the rack; and d) driving the skid conveyor drive interface with a drive mechanism attached to said remote vehicle and adapted to drive the skid conveyor drive interface.

14. A method of handling skids in a flow through storage system comprising:

a) indexing with an indexing member a first skid immediately rear the indexing member as the skid is being conveyed toward the indexing member on a conveyor;

b) lifting an empty skid immediately forward the indexing member with a lift member operable to generate a lift force sufficient to lift an empty skid;

c) removing said empty skid for storing with a mobile remote vehicle releasing the first skid from the indexing member and conveying said first skid over the lift member, depressing said lift member;

d) receiving and supporting said empty skid with a rack attached to said storage bin;

e) moving the skid along the rack with a skid conveyor belt operatively attached to said storage bin and having spaced skid conveyor prongs extending perpendicular from the belt so that when the belt conveys, the skid conveyor prongs are positioned adjacent the skid;

f) driving the skid conveyor with a skid conveyor drive interface mechanically engaging said conveyor.

15. A method of handling skids in a flow through storage system comprising the step of:

a) providing a flow through storage bin having a conveyor operable to convey a skid and said bin having a rack attached to said storage bin adapted to receive an empty skid from said conveyor and support the empty skid and said bin having a conveyor belt with skid conveyor prongs operable to move the skid along the rack when said conveyor is powered; and b) providing a spring loaded lift mechanism operable to provide a lift force and further operable to depress when a sufficient downward force is applied to said lift member overcoming the lift force and said lift mechanism having an indexing member operatively attached thereto and said member adapted to elevate to a position for indexing a skid when said lift member is depressed and lower to release the skid when the lift member is not depressed.

* * * * *